United States Patent
Unno et al.

(10) Patent No.: US 12,439,079 B2
(45) Date of Patent: Oct. 7, 2025

(54) IMAGE DECODING DEVICE, IMAGE DECODING METHOD, AND PROGRAM

(71) Applicant: KDDI CORPORATION, Tokyo (JP)

(72) Inventors: Kyohei Unno, Fujimino (JP); Kei Kawamura, Fujimino (JP); Sei Naito, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 18/646,616

(22) Filed: Apr. 25, 2024

(65) Prior Publication Data

US 2024/0283972 A1   Aug. 22, 2024

Related U.S. Application Data

(63) Continuation of application No. 17/674,347, filed on Feb. 17, 2022, now Pat. No. 12,010,339, which is a (Continued)

(30) Foreign Application Priority Data

Sep. 20, 2019 (JP) ................. 2019-172133

(51) Int. Cl.
*H04N 19/577* (2014.01)
*H04N 19/137* (2014.01)
*H04N 19/176* (2014.01)
*H04N 19/64* (2014.01)
*H04N 19/513* (2014.01)

(52) U.S. Cl.
CPC ......... *H04N 19/577* (2014.11); *H04N 19/137* (2014.11); *H04N 19/176* (2014.11); *H04N 19/64* (2014.11); *H04N 19/513* (2014.11)

(58) Field of Classification Search
None
See application file for complete search history.

(56) References Cited

U.S. PATENT DOCUMENTS 11,153,599 B2 * 10/2021 Su ................ H04N 19/463
2017/0094305 A1 * 3/2017 Li ................ H04N 19/52
(Continued)

OTHER PUBLICATIONS

Xiu et al., "CE4-related: Harmonization of BDOF and PROF," Joint Video Experts Team (JVET) of ITU-T SG 16 WP 3 and ISO/IEC JTC 1/SC 29/WG 11, 15th Meeting: Gothenburg, Sweden, Jul. 3-12, 2019, Document: JVET-O0593-r2 (Year: 2019).*

(Continued)

Primary Examiner — Justin W Rider
(74) Attorney, Agent, or Firm — Troutman Pepper Locke LLP

(57) ABSTRACT

An image decoding device includes: a prediction signal generation unit configured to determine whether or not an application condition of Bi-Directional Optical Flow (BDOF) processing is satisfied for each block, generate a prediction signal by executing the BDOF processing in a case where it is determined that the application condition is satisfied, and set the application condition based on a weight coefficient in a case where calculation is performed using pixel values of two reference frames or values calculated from the pixel values in the BDOF processing such that the application condition includes a condition on time distances between the two reference frames and a target frame.

3 Claims, 16 Drawing Sheets

Related U.S. Application Data continuation of application No. PCT/JP2020/031563, filed on Aug. 21, 2020.

(56) References Cited

U.S. PATENT DOCUMENTS

| | | | |
|---|---|---|---|
| 2019/0141333 A1 | 5/2019 | Lee | |
| 2019/0246143 A1* | 8/2019 | Zhang | H04N 19/132 |
| 2019/0320197 A1* | 10/2019 | Chen | H04N 19/139 |
| 2021/0092404 A1* | 3/2021 | Huang | H04N 19/513 |
| 2021/0136401 A1* | 5/2021 | Liu | H04N 19/513 |
| 2021/0144400 A1* | 5/2021 | Liu | H04N 19/70 |
| 2021/0152846 A1* | 5/2021 | Zhang | H04N 19/543 |
| 2021/0227209 A1* | 7/2021 | Liu | H04N 19/583 |
| 2021/0227250 A1* | 7/2021 | Liu | H04N 19/513 |
| 2021/0235073 A1* | 7/2021 | Liu | H04N 19/86 |
| 2021/0235083 A1* | 7/2021 | Liu | H04N 19/186 |
| 2021/0235110 A1* | 7/2021 | Liu | H04N 19/52 |
| 2021/0266585 A1* | 8/2021 | Liu | H04N 19/139 |
| 2021/0266587 A1* | 8/2021 | Liu | H04N 19/184 |
| 2021/0266588 A1* | 8/2021 | Liu | H04N 19/52 |
| 2021/0297673 A1* | 9/2021 | Zhang | H04N 19/52 |
| 2021/0329257 A1* | 10/2021 | Sethuraman | H04N 19/119 |
| 2021/0344909 A1* | 11/2021 | Liu | H04N 19/52 |
| 2021/0360279 A1* | 11/2021 | Liu | H04N 19/186 |
| 2021/0385481 A1* | 12/2021 | Liu | H04N 19/105 |
| 2021/0385482 A1* | 12/2021 | Liu | H04N 19/513 |
| 2022/0174314 A1* | 6/2022 | Unno | H04N 19/577 |
| 2023/0121088 A1* | 4/2023 | Jeong | H04N 19/139 375/240.16 |

OTHER PUBLICATIONS

Li et al., "CE4-related: Alignment of BDOF refinement process with PROF," Joint Video Experts Team (JVET) of ITU-T SG 16 WP 3 and ISO/IEC JTC 1/SC 29/WG 11, 15th Meeting: Gothenburg, Sweden, Jul. 3-12, 2019, Document: JVET-O0123-v3 (Year: 2019).*

Chen et al., "Non-CE9: Modified enabling condition for DMVR and BDOF," Joint Video Experts Team (JVET) of ITU-T SG 16 WP 3 and ISO/IEC JTC 1/SC 29/WG 11, 14th Meeting: Geneva, Switzerland, Mar. 19-27, 2019, Document: JVET-N0162-v2 (Year: 2019).*

Chen, Fangdong et al., Non-CE9: Modified enabling condition for DMVR and BDOF, Joint Video Experts Team (JVET) of ITU-T SG 16 WP 3 and ISO/IEC JTC 1/SC 29/WG 11 14th Meeting: Geneva, CH, 19-27, Mar. 19, 2019, pp. 1-4 in particular, abstract, 1 Introduction, 2. 2 Modification 2: Unified POC condition for DMVR and BDOF cited in ISR.

Xiu, Xiaoyu et al., CE4-related: Harmonization of BDOF and PROF, Joint Video Experts Team (JVET) of ITU-T SG 16 WP 3 and ISO/IEC JTC 1/SC 29/WG 11 15th Meeting: Gothenburg, SE, 3-12, Jul. 7, 2019, (version 4), pp. 1-6 in particular cited in ISR.

Unno, Kyohei et al., Non-CE4: An applying condition of BDOF, Joint Video Experts Team (JVET) of ITU-T SG 16 WP 3 and ISO/IEC JTC 1/SC 29/WG 11 16th Meeting: Geneva, CH, 1-11, Oct. 5, 2019, (version 3), pp. 1-3 in particular cited in ISR.

Chen, Wei et al., Non-CE4: Unification of DMVR and BDOF enabling conditions, Joint Video Experts Team (JVET) of ITU-T SG 16 WP 3 and ISO/IEC JTC 1/SC 29/WG 11 16th Meeting: Geneva, CH, 1-11, Oct. 9, 2019, (version 2), pp. 13 in particular cited in ISR.

Chen, Chun-Chi et al., CE4-related: Harmonized CU-level Condition Check in BDOF and DMVR, Joint Video Experts Team (JVET) of ITU-T SG 16 WP 3 and ISO/IEC JTC 1/SC 29/WG 11 16th Meeting: Geneva, CH, Oct. 1-11, 2019, (version 3), Sep. 30, 2019, pp. 1-2 in particular, 2.2 Equal-poc-distance imposed on BDOF entire text cited in ISR.

Li, Jingya et al., CE4-related: Alignment of BDOF refinement process with PROF, Joint Video Experts Team (JVET) of ITU-T SG 16 WP 3 and ISO/IEC JTC 1/SC 29/WG 11 15th Meeting: Gothenburg, SE, Jul. 3-12, 2019, Jun. 29, 2019, pp. 1-3 entire text cited in ISR.

Xiu, Xiaoyu et al., CE4: Harmonization of BDOF and PROF (test 4-2. 1 and 4-2.2), Joint Video Experts Team (JVET) of ITU-T SG 16 WP 3 and ISO/IEC JTC 1/SC 29/WG 11 16th Meeting: Geneva, CH, Oct. 1-11, 2019, (version 1), Sep. 18, 2019, pp. 1-5 entire text cited in ISR.

Xiu, Xiaoyu et al., CE4/9-related: Combined Test of JVET-O0593/ JVET-O0252/ JVET-O0281/JVET-O0615 on harmonization on BDOF and PROF, Joint Video Experts Team (JVET) of ITU-T SG 16 WP 3 and ISO/IEC JTC 1/SC 29/WG 11 15th Meeting: Gothenburg, SE, Jul. 3-12, 2019, Jul. 9, 2019, pp. 1-5 entire text cited in ISR.

Liu, Hongbin et al., Non-CE9: Unified gradient calculations in BDOF, Joint Video Experts Team (JVET) of ITU-T SG 16 WP 3 and ISO/IEC JTC 1/SC 29/WG 11 15th Meeting: Gothenburg, SE, Jul. 3-12, 2019, (version 4), Jul. 9, 2019, pp. 1-3 entire text cited in ISR.

Lai, Chen-Yen et al., CE4-related: Alignment of displacement bitdepths for BDOF and PROF, Joint Video Experts Team (JVET) of ITU-T SG 16 WP 3 and ISO/IEC JTC 1/SC 29/WG 11 15th Meeting: Gothenburg, SE, Jul. 3-12, 2019, Jul. 3, 2019, pp. 1-6 entire text cited in ISR.

Huang, Han, CE4-related: Alignment and simplification of PROF and BDOF, Joint Video Experts Team (JVET) of ITU-T SG 16 WP 3 and ISO/IEC JTC 1/SC 29/ WG 11 15th Meeting: Gothenburg, SE (version 2), Jul. 3, 2019, pp. 1-7 entire text cited in ISR.

International Search Report issued in corresponding International Patent Application No. PCT/JP2020/031563 dated Nov. 17, 2020.

Bross, Benjamin, Versatile Video Coding (Draft 6), JVET-N1001, Joint Video Experts Team (JVET) of ITU-T SG 16 WP 3 and ISO/IEC JTC 1/SC 29 WG 11, 15 Meeting: Gothenburg, SE, Jul. 3-12, 2019.

Extended European Search Report dated Feb. 22, 2023, from correspondonding EP Application No. 20865177.8.

Chujoh T et al: "Non-CE9: On conditions for DMVR and BDOF", 14. JVET Meeting; Mar. 19, 2019-Mar. 27, 2019; Geneva; (The Joint Video Exploration Team of ISO/IEC JTC1/SC29/WG11 and ITU-T SG. 16), No. JVET-N0146 Mar. 26, 2019 (Mar. 26, 2019), XP030256817, Retrieved from the Internet: URL:http://phenix.int-evry.fr/jvet/doc_end_user/documents/14_Geneva/wg11/JVET-N0146-v4.zip JVET-N0146-vl.docx [retrieved on Mar. 26, 2019].

Bross Benjamin et al: "Versatile Video Coding (Draft 6)", 15. JVET Meeting; Jul. 3, 2019-Jul. 12, 2019; Gothenburg; (The Joint Video Exploration Team of ISO/IEC JTC1/SC29/WG11 and ITU-T SG.16 ), No. JVET-O2001 Jul. 15, 2019 (Jul. 15, 2019), XP030293938, Retrieved from the Internet: URL : https://jvet-experts.org/doc_user/documents/15_Gothenburg/wg11/JVET-O2001-v8.zip JVET-O2001-v8.docx [retrieved on Jul. 15, 2019] *p. 32-p. 250*.

Li et al., "CE4-related: Alignment of BDOF refinement process with PROF," Joint Video Experts Team (JVET) of ITU-T SG 16 WP 3 and ISO/IEC JTC 1/SC 29/WG 11, 15th Meeting: Gothenburg, Sweden, Jul. 3-12, 2019, Document: JVET-O0123-v3. (Year: 2019).

* cited by examiner

FIG. 4

| | Descriptor |
|---|---|
| seq_parameter_set_rbsp( ) { | |
| ... | |
| sps_seq_parameter_set_id | ue(v) |
| ... | |
| sps_bdof_enabled_flag | u(1) |
| sos_dmvr_enabled_flag | u(1) |
| sps_affine_enabled_flag | u(1) |
| if(sps_affine_enabled_flag) { | |
| sps_affine_type_flag | u(1) |
| sps_affine_prof_enabled_flag | u(1) |
| } | |
| if(sps_bdof_enabled_flag \|\| sps_dmvr_enabled_flag \|\| sps_affine_prof_enabled_flag) | |
| sps_bdof_dmvr_prof_slice_present_flag | u(1) |
| ... | |

FIG. 5

| slice_header( ) { | Descriptor |
|---|---|
| slice_pic_parameter_set_id | ue(v) |
| ... | |
| if(sps_bdof_dmvr_prof_slice_present_flag) | |
| slice_disable_bdof_dmvr_prof_flag | u(1) |
| ... | |

FIG. 13

| CONDITIONS | BOUNDARY INTENSITY |
|---|---|
| CONDITION INDICATING THAT AT LEAST ONE OF BLOCKS ON BOTH SIDES OF BOUNDARY IS INTRA-PREDICTION BLOCK | 2 |
| CONDITION INDICATING THAT NON-ZERO TRANSFORMATION COEFFICIENT EXISTS IN AT LEAST ONE OF BLOCKS ON BOTH SIDES OF BOUNDARY AND BLOCK BOUNDARY IS TU BOUNDARY | 1 |
| CONDITION INDICATING THAT ABSOLUTE VALUE OF DIFFERENCE BETWEEN MOTION VECTORS OF BLOCKS ON BOTH SIDES OF BOUNDARY IS EQUAL TO OR LARGER THAN 1/2 PIXEL | 1 |
| CONDITION INDICATING THAT REFERENCE IMAGE IS DIFFERENT OR THE NUMBER OF MOTION VECTORS IS DIFFERENT IN BLOCKS ON BOTH SIDES OF BOUNDARY | 1 |
| OTHER CONDITIONS | 0 |

FIG. 19

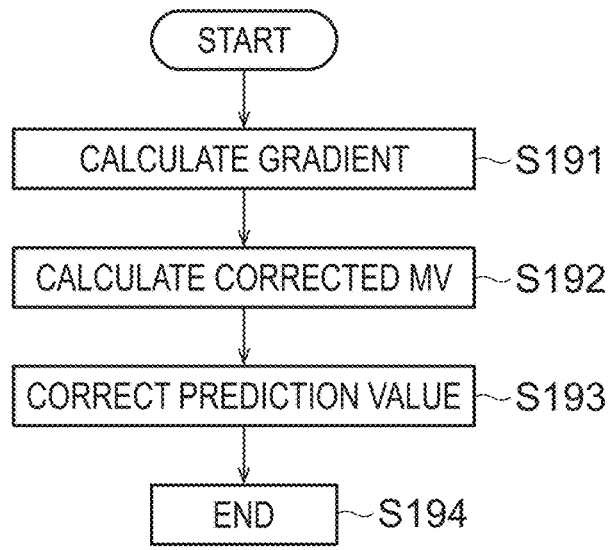

FIG. 20

| CONDITIONS | BOUNDARY INTENSITY |
|---|---|
| CONDITION INDICATING THAT AT LEAST ONE OF BLOCKS ON BOTH SIDES OF BOUNDARY IS INTRA-PREDICTION BLOCK | 2 |
| CONDITION INDICATING THAT NON-ZERO TRANSFORMATION COEFFICIENT EXISTS IN AT LEAST ONE OF BLOCKS ON BOTH SIDES OF BOUNDARY AND BLOCK BOUNDARY IS TU BOUNDARY | 1 |
| CONDITION INDICATING THAT ABSOLUTE VALUE OF DIFFERENCE BETWEEN MOTION VECTORS OF BLOCKS ON BOTH SIDES OF BOUNDARY IS EQUAL TO OR LARGER THAN 1/2 PIXEL AND BOUNDARY IS NOT SUB-BLOCK BOUNDARY TO WHICH PROF IS APPLIED | 1 |
| CONDITION INDICATING THAT REFERENCE IMAGE IS DIFFERENT OR THE NUMBER OF MOTION VECTORS IS DIFFERENT IN BLOCKS ON BOTH SIDES OF BOUNDARY | 1 |
| OTHER CONDITIONS | 0 |

IMAGE DECODING DEVICE, IMAGE DECODING METHOD, AND PROGRAM

CROSS-REFERENCE TO RELATED APPLICATIONS

The present application is a continuation of U.S. application Ser. No. 17/674,347, filed on Feb. 17, 2022, which is a continuation of PCT Application No. PCT/JP2020/031563, filed on Aug. 21, 2020, which claims the benefit of Japanese patent application No. 2019-172133 (filed on Sep. 20, 2019). The contents of which are incorporated by reference herein in their entirety.

TECHNICAL FIELD

The present invention relates to an image decoding device, an image decoding method, and a program.

BACKGROUND ART

Conventionally, BDOF (Bi-Directional Directional Optical BDOF (Bi-Directional Optical Flow) technology is known to generate a prediction signal using the pixel values of two reference frames. The method having a condition that one of the two reference frames is a frame in the future and the other one is a frame in the past as an application condition of the BDOF on a block-by-block basis is known (see, for example, non-patent document 1).

SUMMARY

However, the BDOF processing in the Non patent document 1 performs a calculation between pixel values between two reference frames and a calculation between gradients calculated from pixel values (e.g., adding and subtracting etc.) etc., by using equal weights. This processing implicitly assumes that an absolute value of a time distance between the target frame and a reference frame in the future direction is equal to an absolute value of a time distance between the target frame and a reference frame in the past direction. On the other hand, in the application condition of the BDOF, the time distance between reference frames is not considered.

The present invention has been made in view of the above-described problems, and an object of the present invention is to provide an image decoding device, an image decoding method, and a program capable of setting a condition regarding a distance between the target frame and the reference frame in the application condition of BDOF in accordance with a weight for pixel values of each reference frames in calculations in the BDOF processing.

Solution to Problem

The first aspect of the present invention is summarized as an image decoding device including: a prediction signal generation unit configured to determine whether or not an application condition of BDOF (Bi-Directional Optical Flow) processing is satisfied for each block, generate a prediction signal by executing the BDOF processing in a case where it is determined that the application condition is satisfied, and set the application condition based on a weight coefficient in a case where calculation is performed using pixel values of two reference frames or values calculated from the pixel values in the BDOF processing such that the application condition includes a condition on time distances between the two reference frames and a target frame.

The second aspect of the present invention is summarized as an image decoding device including: a prediction signal generation unit configured to perform BDOF (Bi-Directional Optical Flow) processing; and an affine prediction signal generation unit configured to perform PROF (Prediction Refinement with Optical Flow) processing, wherein gradient calculation processing in the BDOF processing performed by the prediction signal generation unit and gradient calculation processing in the PROF processing performed by the affine prediction signal generation unit are the same processing in a case where the PROF processing is applied to both of two reference frames.

The third aspect of the present invention is summarized as an image decoding method including: determining whether or not an application condition of BDOF processing is satisfied for each block; generating a prediction signal by executing the BDOF processing in a case where it is determined that the application condition is satisfied; and setting the application condition based on a weight coefficient in a case where calculation is performed using pixel values of two reference frames or values calculated from the pixel values in the BDOF processing such that the application condition includes a condition on time distances between the two reference frames and a target frame.

The fourth aspect of the present invention is summarized as a program causing a computer to function as an image decoding device, the image decoding device being configured to: determine whether or not an application condition of bi-directional optical flow (BDOF) processing is satisfied for each block, generate a prediction signal by executing the BDOF processing in a case where it is determined that the application condition is satisfied, and set the application condition based on a weight coefficient in a case where calculation is performed using pixel values of two reference frames or values calculated from the pixel values in the BDOF processing such that the application condition includes a condition on time distances between the two reference frames and a target frame.

Advantageous Effects of Invention

According to the present invention, it is possible to provide an image decoding device, an image decoding method, and a program capable of setting a condition regarding a distance between the target frame and the reference frame in the application condition of BDOF in accordance with a weight for pixel values of each reference frames in calculations in the BDOF processing.

BRIEF DESCRIPTION OF DRAWINGS

FIG. 4 is a diagram illustrating an example of control data included in an SPS 141 illustrated in FIG. 3.

FIG. 5 is an example of control data included in a slice header 143A illustrated in FIG. 3.

FIG. 13 is a diagram for explaining a processing procedure of a boundary intensity determination unit 153 (153A/153B) of the in-loop filter processing unit 150 of the image encoding device 100 according to the embodiment.

FIG. 19 is a diagram for explaining Modification Example 2.

FIG. 20 is a diagram for explaining Modification Example 2.

DESCRIPTION OF EMBODIMENTS

An embodiment of the present invention will be explained hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

First Embodiment

Figure 1:
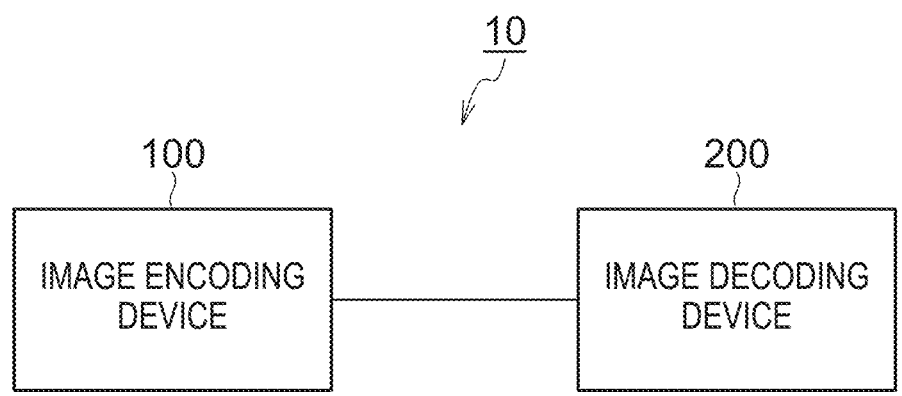
FIG. 1 is a diagram illustrating an example of a configuration of an image processing system 10 according to an embodiment.

An image processing system 10 according to a first embodiment of the present invention is explained below with reference to FIG. 1 to FIG. 16. FIG. 1 is a diagram illustrating the image processing system 10 according to an embodiment according to this embodiment.

As illustrated in FIG. 1, the image processing system 10 includes an image encoding device 100 and an image decoding device 200.

The image encoding device 100 is configured to encode an input image signal to thereby generate encoded data. The image decoding device 200 is configured to decode the encoded data to generate an output image signal.

Such encoded data may be transmitted from the image encoding device 100 to the image decoding device 200 via a transmission line. The encoded data may be stored in a storage medium and then provided from the image encoding device 100 to the image decoding device 200.

(Image Encoding Device 100)

Figure 2:
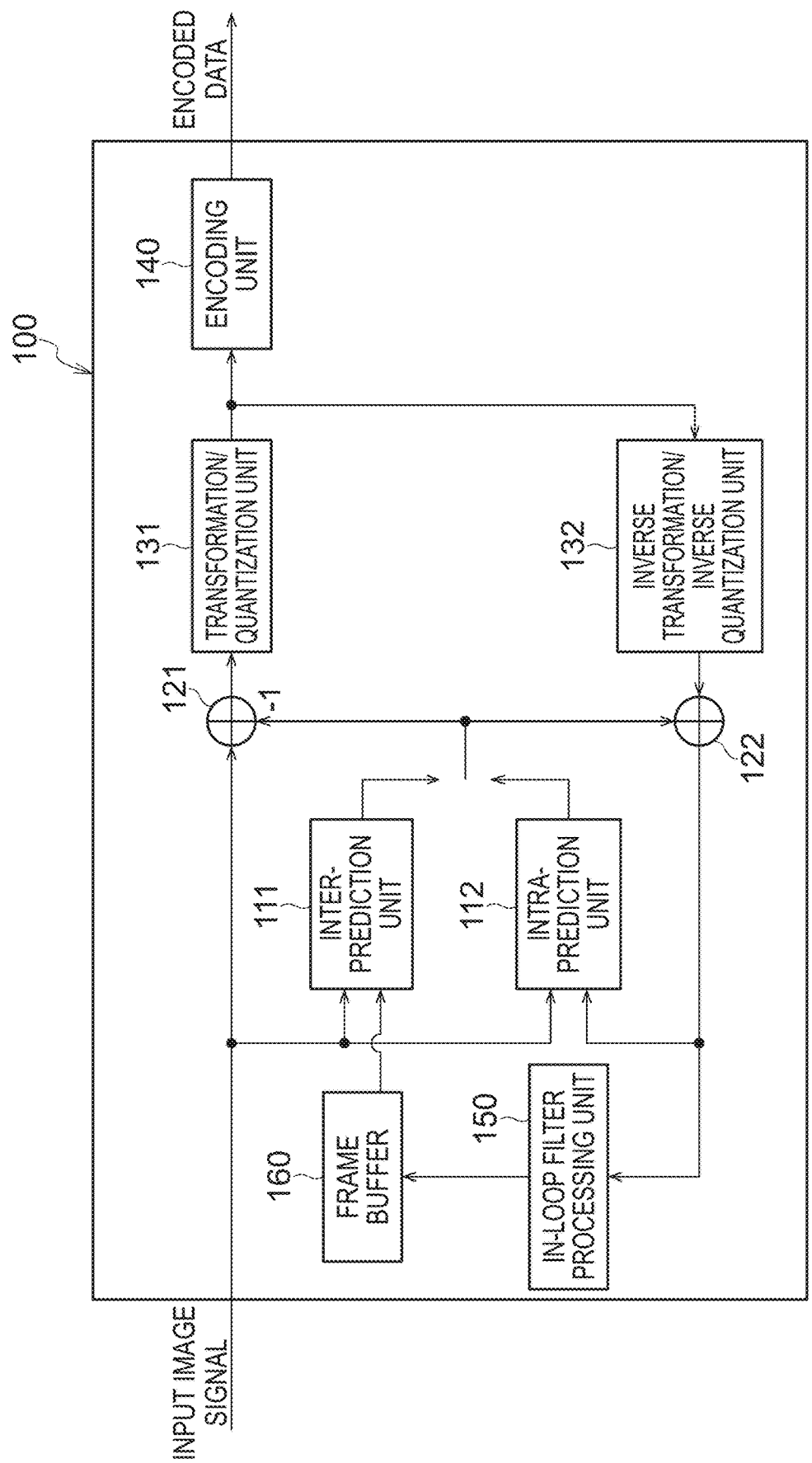
FIG. 2 is a diagram illustrating an example of functional blocks of an image encoding device 100 according to the embodiment.

The image encoding device 100 according to this embodiment is explained below with reference to FIG. 2. FIG. 2 is a diagram illustrating an example of functional blocks of the image encoding device 100 according to this embodiment.

As illustrated in FIG. 2, the image encoding device 100 includes an inter prediction unit 111, an intra prediction unit 112, a subtractor 121, an adder 122, a transformation/quantization unit 131, an inverse transformation/inverse quantization unit 132, an encoding unit 140, an in-loop filter processing unit 150, and a frame buffer 160.

The inter prediction unit 111 is configured to generate a prediction signal through inter prediction (inter-frame prediction).

Specifically, the inter prediction unit 111 is configured to specify, through comparison of an encoding target frame (hereinafter, target frame) and a reference frame stored in the frame buffer 160, a reference block included in the reference frame and determine a motion vector with respect to the specified reference block.

The inter prediction unit 111 is configured to generate, based on the reference block and the motion vector, for each prediction block, the prediction signal included in the prediction block. The inter prediction unit 111 is configured to output the prediction signal to the subtractor 121 and the adder 122. The reference frame is a frame different from the target frame.

The intra prediction unit 112 is configured to generate the prediction signal through intra prediction (intra-frame prediction).

Specifically, the intra prediction unit 112 is configured to specify the reference block included in the target frame and generate, for each prediction block, the prediction signal based on the specified reference block. The intra prediction unit 112 is configured to output the prediction signal to the subtractor 121 and the adder 122.

The reference block is a block referred to about a prediction target block (hereinafter, target block). For example, the reference block is a block adjacent to the target block.

The subtractor 121 is configured to subtract the prediction signal from the input image signal and output a prediction remainder signal to the transformation/quantization unit 131. The subtractor 121 is configured to generate the prediction remainder signal, which is a difference between the prediction signal generated by the intra prediction or the inter prediction and the input image signal.

The adder 122 is configured to add the prediction signal to the prediction remainder signal output from the inverse transformation/inverse quantization unit 132 to generate a decoded signal prior to the filtering process and output such a decoded signal prior to the filtering process to the intra prediction unit 112 and the in-loop filter processing unit 150.

The decoded signal prior to the filtering process configures the reference block used in the intra prediction unit 112.

The transformation/quantization unit 131 is configured to perform transformation processing of the prediction remainder signal and acquire a coefficient level value. Further, the transformation/quantization unit 131 may be configured to perform quantization of the coefficient level value.

The transformation processing for transforming the prediction remainder signal into a frequency component signal. In such transformation processing, a base pattern (a transformation matrix) corresponding to discrete cosine transform (DCT) may be used or a base pattern (a transformation matrix) corresponding to discrete sine transform (DST) may be used.

The inverse transformation/inverse quantization unit 132 is configured to perform inverse transformation processing of the coefficient level value output from the transformation/quantization unit 131. The inverse transformation/inverse quantization unit 132 is configured to perform inverse quantization of the coefficient level value prior to the inverse transformation processing.

The inverse transformation processing and the inverse quantization are performed in a procedure opposite to the transformation processing and the quantization performed in the transformation/quantization unit 131.

The encoding unit 140 is configured to encode the coefficient level value output from the transformation/quantization unit 131 and output encoded data.

For example, the encoding is entropy encoding for allocating a code of different length based on an occurrence probability of the coefficient level value.

The encoding unit 140 is configured to encode, in addition to the coefficient level value, control data used in decoding processing.

The control data may include size data such as an encoding block (CU: Coding Unit) size, a prediction block (PU: Prediction Unit) size, and a transformation block (TU: Transform Unit) size.

The in-loop filter processing unit 150 is configured to perform filter processing on the decoded signal prior to the filtering process output from the adder 122 and output a filtered decoded signal to the frame buffer 160.

Here, for example, the filter processing is deblocking filter processing to reduce a distortion occurring at a boundary portion of a block (an encoding block, a prediction block, or a transformation block).

The frame buffer 160 is configured to accumulate the reference frame used in the inter prediction unit 111.

The filtered decoded signal configures the reference frame used in the inter prediction unit 111.

(Encoding Unit 140)

Figure 3:
FIG. 3 is a diagram illustrating an example of a configuration of encoded data (bit stream) output from an encoding unit 140 of the image encoding device 100 according to the embodiment.

Hereinafter, control data encoded by the encoding unit 140 will be described with reference to FIG. 3 to FIG. 5. FIG. 3 is a configuration example of encoded data (bit stream) output from the encoding unit 140.

First, the bit stream may include a sequence parameter set (SPS) 141 at a head portion. The SPS 141 is a set of control data in units of sequences (sets of pictures). A specific example will be described later. In a case where a plurality of SPS 141 exist, each SPS 141 includes at least id information for individually identifying the SPS 141.

The bit stream may include a picture parameter set (PPS) 142 next to the SPS 141. The PPS 142 is a set of control data in units of pictures (a set of slices). In a case where a plurality of SPS 141 exist, each PPS 142 includes at least id information for individually identifying the PPS 142. Further, each PPS 142 includes at least SPS id information for designating the SPS 141 corresponding to each PPS 142.

The bit stream may include a slice header 143A next to the PPS 142. The slice header 143A is a set of control data in units of slices. A specific example will be described later. Each slice header 143A includes at least PPS id information for designating the PPS 142 corresponding to each slice header 143A.

The bit stream may include slice data 144A next to the slice header 143A. The slice data 144A may include the coefficient level value, the size data, and the like.

As described above, one slice header 143A/143B, the PPS 142, and the SPS 141 correspond to each of pieces of slice data 144A/144B. As described above, the PPS id information indicating the PPS 142 to be referred to is designated in the slice header 143A/143B, and the SPS id information indicating the SPS 141 to be referred to is designated in the PPS 142. Thus, the SPS 141 and the PPS 142 that are common to a plurality of pieces of slice data 144A/144B may be used.

In other words, the SPS 141 and the PPS 142 are not necessarily transmitted for each of pieces of the slice data 144A/144B. For example, as illustrated in FIG. 3, a stream in which the SPS 141 and the PPS 142 are not encoded immediately before the slice header 143B and the slice data 144B may be configured.

Note that the configuration of FIG. 3 is merely an example. A component other than the above-described components may be added as a component of the stream, as long as the component has a configuration in which the control data designated by the slice header 144A/144B, the PPS 142, and the SPS 141 corresponds to each of pieces of the slice data 144A/144B. Further, similarly, in transmission, the bit stream may be changed into a configuration different from the configuration of FIG. 3.

FIG. 4 is a diagram illustrating an example of control data included in the SPS 141.

As described above, the SPS 141 includes at least id information (sps_seq_parameter_set_id) for identifying each SPS 141.

The SPS 141 may include "sps_bdof_enabled_flag" which is a flag for controlling enabling/disabling (availability/non-availability) of bi-directional optical flow (BDOF) processing to be described later. When a value of the flag is "0", it means that the BDOF processing is disabled in the slice corresponding to the SPS 141. On the other hand, when a value of the flag is "1", it means that the BDOF processing is enabled in the slice corresponding to the SPS 141. Whether to actually enable the BDOF processing in each block of the slice is determined for each block by processing to be described later.

That is, "sps_bdof_enabled_flag" is a flag (fourth flag) that is included in the SPS 141 and indicates enabling/disabling of the BDOF processing in units of sequences.

The SPS 141 may include "sps_dmvr_enabled_flag" which is a flag for controlling enabling/disabling (availability/non-availability) of decoder-side motion vector refinement (DMVR) processing to be described later. When a value of the flag is "0", it means that the DMVR processing is disabled in the slice corresponding to the SPS 141. On the other hand, when a value of the flag is "1", it means that the DMVR processing is enabled in the slice corresponding to the SPS 141. Whether to actually enable the DMVR processing in each block of the slice is determined for each block by processing to be described later.

That is, "sps_dmvr_enabled_flag" is a flag (third flag) that is included in the SPS 141 and indicates enabling/disabling of the DMVR processing in units of sequences.

The SPS 141 may include "sps_affine_enabled_flag" which is a flag for controlling enabling/disabling (availability/non-availability) of an affine motion compensation to be described later. When a value of the flag is "0", it means that the affine motion compensation is disabled in the slice corresponding to the SPS 141. On the other hand, when a value of the flag is "1", it means that the affine motion compensation is enabled in the slice corresponding to the SPS 141. Whether to actually enable the affine motion compensation in each block of the slice is determined for each block by processing to be described later.

That is, "sps_affine_prof_enabled_flag" is a flag (fifth flag) that is included in the SPS 141 and indicates enabling/disabling of PROF processing in units of sequences.

When "sps_affine_enabled_flag" is "1", the SPS 141 may additionally include a flag "sps_affine_type_flag". When a value of the flag is "0", it means that the number of parameters in the affine motion compensation to be described later is always set to "4" in the slice corresponding to the SPS 141. On the other hand, when a value of the flag is "1", it means that the number of parameters may be selected from "4" or "6" for each block of the slice corresponding to the SPS 141 when the affine motion compensation is performed.

When a value of "sps_affine_enabled_flag" is "1", the SPS 141 may additionally include a flag "sps_affine_prof_enabled_flag". When a value of the flag is "0", it means that prediction refinement with optical flow (PROF) processing to be described later is disabled in the slice corresponding to the SPS 141. On the other hand, when a value of the flag is "1", it means that the PROF processing is enabled in the slice corresponding to the SPS 141. Whether to actually enable the PROF processing in each block of the slice is determined for each block by processing to be described later.

When a value of at least one of the flag "sps_bdof_enabled_flag", the flag "sps_dmvr_enabled_flag", or the flag "sps_affine_prof_enabled_flag" is "1", the SPS 141 may additionally include a flag "sps_bdof_dmvr_prof_slice_present_flag". When a value of the flag is "1", it means that a flag "slice_disable_bdof_dmvr_prof_flag" to be described later is included in the slice header 143A/143B corresponding to the SPS 141. When a value of the flag is "0", it means that the flag "slice_disable_bdof_dmvr_prof_flag" is not included in the slice header 143A/143B corresponding to the SPS 141.

In other words, the flag "sps_bdof_dmvr_prof_slice_present_flag" is a flag (second flag) indicating whether or not the flag "slice_disable_bdof_dmvr_prof_flag" is included in the slice header 143A/143B. In a case where the flag does not exist, it may be implicitly regarded that the value of the flag is "0".

FIG. 5 is a diagram illustrating an example of control data included in the slice header 143A/143B.

As described above, the slice header 143A/143B includes at least "slice_pic_parameter_set_id" which is PPS id information for designating the PPS 142 corresponding to the slice. As described above, the SPS 141 which is referred to in the PPS designated by the PPS id information is the SPS 141 corresponding to the slice header 143A/143B.

When the flag "sps_bdof_dmvr_prof_slice_present_flag" is included in the SPS 141 corresponding to the slice header 143A/143B and a value of the flag is "1", the flag "slice_disable_bdof_dmvr_prof_flag" may be included in the slice header 143A/143B. In a case where a value of the flag is "1", as will be described later, a control may be performed such that the BDOF processing, the DMVR processing, and the PROF processing are disabled in each block included in the slice. In a case where a value of the flag is "0", a control may be performed such that the BDOF processing, the DMVR processing, and the PROF processing are enabled in each block included in the slice.

That is, the flag "slice_disable_bdof_dmvr_prof_flag" is a flag (first flag) which is included in the slice header 143A/143B and collectively controls enabling/disabling of the DMVR processing, the BDOF processing, and the PROF processing.

In other words, the flag "slice_disable_bdof_dmvr_prof_flag" is a flag which is included in the slice header 143A/143B and controls enabling/disabling of the PROF processing, a flag which is included in the slice header 143A/143B and controls enabling/disabling of the DMVR processing, and a flag which is included in the slice header 143A/143B and controls enabling/disabling of the BDOF processing.

The value of the flag described above is merely an example. In a case where meanings of the values ("0" and "1") of the flag are reversed, the corresponding processing is reversed according to the meanings. Thus, equivalent processing can be realized.

Further, as described above, by providing the flag for controlling disabling of the BDOF processing, the DMVR processing, and the PROF processing in units of slices, it is possible to explicitly control disabling of the functions in the image encoding device 100. In a case where the functions are disabled, it is possible to reduce a processing load and power consumption in the image encoding device 100 and the corresponding image decoding device 200.

(Inter-Prediction Unit 111)

Figure 6:
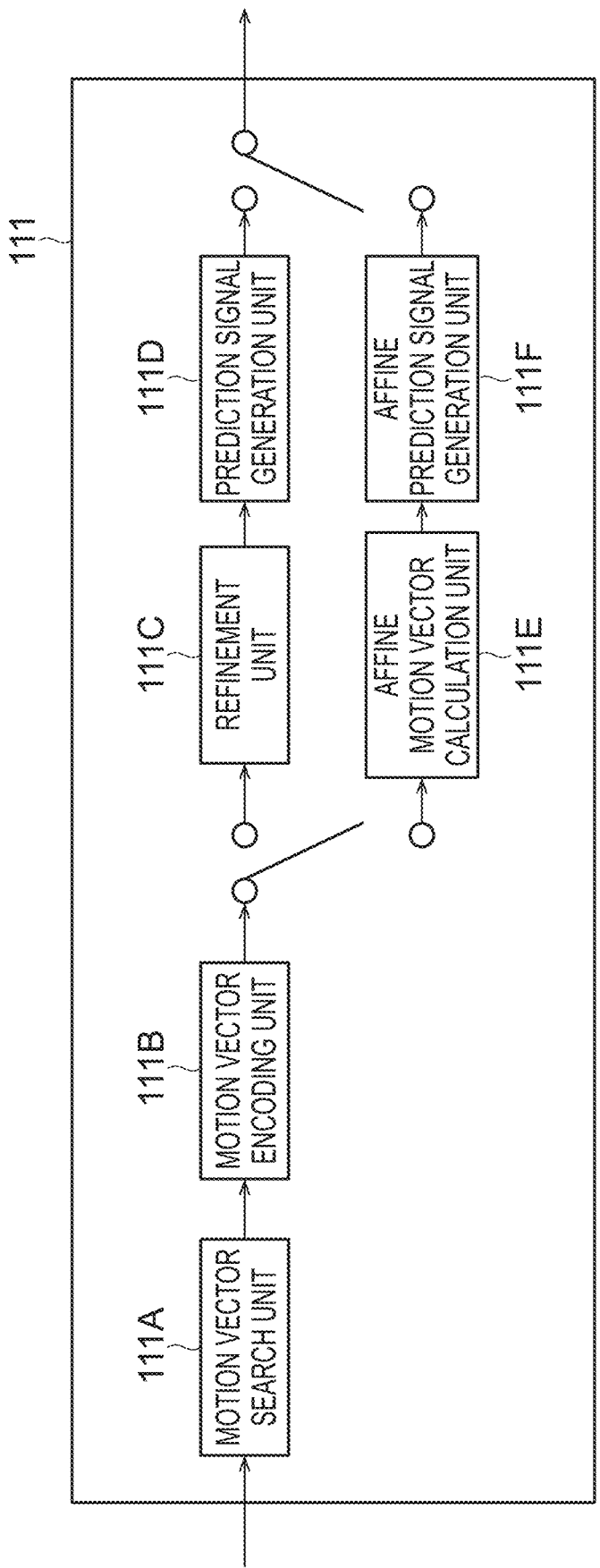
FIG. 6 is a diagram illustrating an example of functional blocks of an inter-prediction unit 111 of the image encoding device 100 according to the embodiment.

Hereinafter, the inter-prediction unit 111 of the image encoding device 100 according to the present embodiment will be described with reference to FIG. 6. FIG. 6 is a diagram illustrating an example of functional blocks of the inter-prediction unit 111 of the image encoding device 100 according to the present embodiment.

As illustrated in FIG. 6, the inter-prediction unit 111 includes a motion vector search unit 111A, a motion vector encoding unit 111B, a refinement unit 111C, a prediction signal generation unit 111D, an affine motion vector calculation unit 111E, and an affine prediction signal generation unit 111F.

The inter-prediction unit 111 is an example of a prediction unit configured to generate a prediction signal to be included in a prediction block based on a motion vector.

The motion vector search unit 111A is configured to specify a reference block included in a reference frame by comparing a target frame with the reference frame, and search for a motion vector for the specified reference block.

In addition, the motion vector search unit 111A determines a reference frame and a motion vector to be used for prediction in a prediction block by performing the searching on a plurality of reference frame candidates. For one block, two reference frames and two motion vectors may be used to the maximum. A case where only one set of the reference frame and the motion vector is used for one block is referred to as uni-prediction, and a case where two sets of the reference frame and the motion vector are used is referred to as bi-prediction. Hereinafter, a first set is referred to as L0, and a second set is referred to as L1.

Further, the motion vector search unit 111A is configured to determine an encoding method of the reference frame and the motion vector. The encoding method includes a merge mode and an affine motion compensation which are to be described later, in addition to a normal method of transmitting reference frame information and motion vector information.

As a method of searching for a motion vector, a method of determining a reference frame, and a method of determining an encoding method of the reference frame and the motion vector, known methods may be adopted. Thus, details thereof will be omitted.

The motion vector encoding unit 111B is configured to encode the reference frame information and the motion vector information determined by the motion vector search unit 111A by using the same encoding method determined by the motion vector search unit 111A. As a method of encoding the reference frame information and the motion vector information, a known method may be adopted. Thus, details thereof will be omitted.

In a case where the encoding method of the block is the merge mode, first, the image encoding device 100 creates a merge list for the block. Here, the merge list is a list in which a plurality of combinations of reference frames and motion vectors are listed.

An index is assigned to each combination. The image encoding device 100 encodes only the index instead of individually encoding the reference frame information and the motion vector information, and transmits the encoded index to the image decoding device 200. The image encoding device 100 and the image decoding device 200 share a method of creating the merge list. Thus, the image decoding device 200 can decode the reference frame information and the motion vector information, only from information on the index.

As a method of creating the merge list, a known method may be adopted. Thus, details thereof will be omitted.

The affine motion compensation is a method of transmitting a small number of parameters for each block and deriving a motion vector for each sub-block obtained by dividing the block based on the parameters and a predetermined model. Details of the method for deriving a motion vector will be described later.

In a case of the affine motion compensation, the motion vector encoding unit 111B is configured to encode control point motion vector information to be described later and the reference frame information. For the control point motion vector, as will be described later, two or three pieces of motion vector information are transmitted for each block.

Further, in a case where the block is a block on which bi-prediction is performed, two or three pieces of control point motion vector information are transmitted for each of L0 and L1. As a specific encoding method, a known method may be adopted. Thus, details thereof will be omitted.

In a case where the affine motion compensation is enabled in the block, the process proceeds to processing by the affine motion vector calculation unit 111E illustrated in FIG. 6. In a case where the affine motion compensation is disabled in the block, the process proceeds to processing by the refinement unit 111C.

The refinement unit 111C is configured to perform refinement processing (for example, DMVR) of correcting the motion vector encoded by the motion vector encoding unit 111B.

Specifically, the refinement unit 111C is configured to perform refinement processing of setting a search range with reference to a reference position specified by the motion vector encoded by the motion vector encoding unit 111B, specifying a correction reference position having a predetermined smallest cost from the search range, and correcting the motion vector based on the correction reference position.

Figure 7:
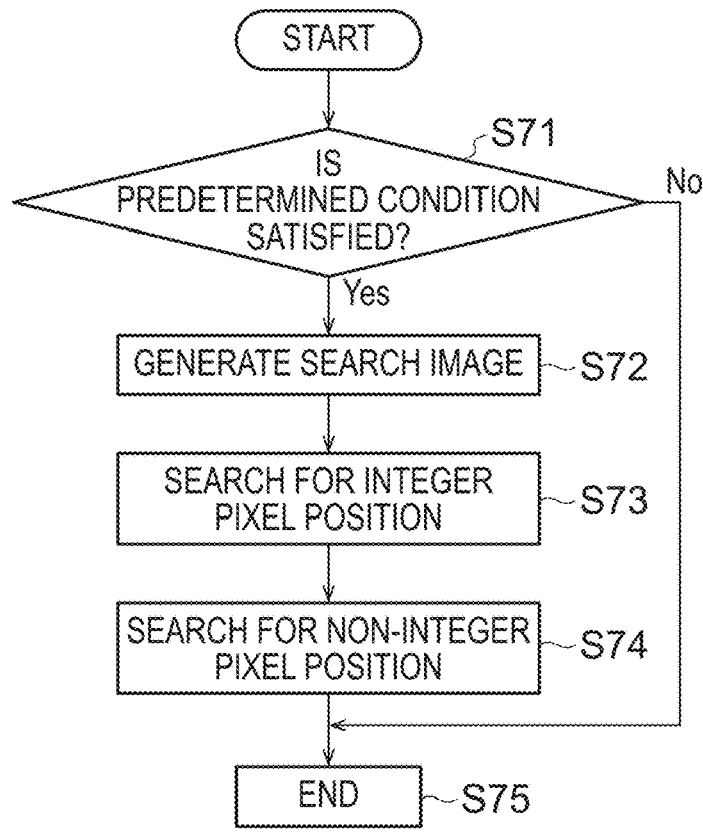
FIG. 7 is a flowchart illustrating an example of a processing procedure of a refinement unit 111C of the inter-prediction unit 111 of the image encoding device 100 according to the embodiment.

FIG. 7 is a flowchart illustrating an example of a processing procedure of the refinement unit 111C.

As illustrated in FIG. 7, in step S71, the refinement unit 111C determines whether or not a predetermined condition for applying refinement processing is satisfied. In a case where all the predetermined conditions are satisfied, the processing procedure proceeds to step S72. On the other hand, in a case where any one of the predetermined conditions is not satisfied, the processing procedure proceeds to step S75, and the refinement processing is ended.

Here, the predetermined condition includes a condition that the block is a block on which bi-prediction is performed.

Further, the predetermined condition may include a condition that one of the reference frame of L0 and the reference frame of L1 is a previous frame in time with respect to a target frame, that the other reference frame is a next frame in time with respect to the target frame, and that a time distance from the target frame (for example, an absolute value of a difference in picture order count (POC)) is equal between L0 and L1.

Further, the predetermined condition may include a condition that the motion vector is encoded in the merge mode.

Further, the predetermined condition may include a condition that, in the SPS 141 of the sequence to which the block belongs, a value of the flag "sps_dmvr_enabled_flag" indicates that DMVR is enabled in the sequence (for example, a value of the flag is "1").

Further, the predetermined condition may include a condition that, in the slice header 143A/143B of the slice to which the block belongs, a value of the flag "slice_disable_bdof_dmvr_prof_flag" indicates that DMVR is enabled in the slice (for example, a value of the flag is "0").

In step S72, the refinement unit 111C generates a search image based on the motion vector encoded by the motion vector encoding unit 111B and the reference frame information.

Here, in a case where the motion vector indicates a non-integer pixel position, the refinement unit 111C interpolates a pixel at the non-integer pixel position by applying a filter to a pixel value of the reference frame. At this time, the refinement unit 111C can reduce a calculation amount by using an interpolation filter having a tap number smaller than a tap number of an interpolation filter used in the prediction signal generation unit 111D to be described later. For example, the refinement unit 111C can interpolate a pixel value at the non-integer pixel position by bilinear interpolation.

In step S73, the refinement unit 111C performs a search with integer pixel accuracy using the search image which is generated in step S72. Here, the integer pixel accuracy means that only points at an integer pixel interval are searched with reference to the motion vector encoded by the motion vector encoding unit 111B.

The refinement unit 111C determines a corrected motion vector at a position at the integer pixel interval by the search in step S72. As a search method, a known method may be used.

For example, the refinement unit 111C can perform a search by using a method of searching for only points at which differential motion vectors of L0 and L1 are a combination obtained by inverting only a sign of the encoded motion vector. In the search, for example, the refinement unit 111C may calculate a search cost at each search point, and determine to correct the motion vector to a search point having a lowest search cost.

Here, the refinement unit 111C may calculate a search cost such that only the search cost at the search point corresponding to the motion vector encoded by the motion vector encoding unit 111B is decreased. For example, for the search point, the refinement unit 111C may set a final search cost of the search point to a value obtained by decreasing the search cost of the other search point by ¾, the search costs being calculated by using the same method.

The search in step S73 is performed, and as a result, there is also a possibility that the motion vector has the same value as the motion vector before the search.

In step S74, the refinement unit 111C performs a motion vector search with non-integer pixel accuracy by using, as an initial value, the corrected motion vector determined in step S73 with integer pixel accuracy. As a method of searching for the motion vector, a known method may be used.

Further, a result of step S73 is input to the refinement unit 111C, and the refinement unit 111C can determine a vector with non-integer pixel accuracy by using a parametric model such as parabolic fitting, without actually performing a search.

In step S74, the refinement unit 111C determines a corrected motion vector with non-integer pixel accuracy. Then, the process proceeds to step S45, and the refinement processing is ended. Here, for convenience, an expression of the corrected motion vector with non-integer pixel accuracy is used. On the other hand, consequently, the corrected motion vector with non-integer pixel accuracy that is obtained from the search result in step S74 may have the same value as the value of the motion vector with integer pixel accuracy that is obtained in step S73.

The refinement unit 111C may divide a block having a size larger than a predetermined threshold value into small sub-blocks and execute the refinement processing for each sub-block. For example, the refinement unit 111C sets a 16×16 pixel as a unit of execution of the refinement processing, and in a case where a size of the block in a horizontal direction or a vertical direction is larger than a size of the 16 pixel, divides the block into sub-blocks having a size equal to or smaller than the size of the 16 pixel. At this time, as the motion vector serving as a reference for the refinement processing, the motion vector of the block encoded by the motion vector encoding unit 111B is used for all the sub-blocks in the same block.

In a case where the processing is performed for each sub-block, the refinement unit 111C may execute all procedures of FIG. 7 for each sub-block. Further, the refinement unit 111C may perform only a part of the processing of FIG. 7 for each sub-block. Specifically, the refinement unit 111C may perform the processing for each block in step S71 and step S72 of FIG. 7, and may perform the processing for each sub-block in step S73 and step S74 of FIG. 7.

The prediction signal generation unit 111D is configured to generate a prediction signal based on the corrected motion vector which is output from the refinement unit 111C.

Here, as will be described later, the prediction signal generation unit 111D is configured to determine whether or not to perform the BDOF processing for each block based on information (for example, a search cost) calculated in the procedure of the refinement processing.

Specifically, the prediction signal generation unit 111D is configured to generate a prediction signal based on the motion vector encoded by the motion vector encoding unit 111B in a case where the motion vector is not corrected. On the other hand, the prediction signal generation unit 111D is configured to generate a prediction signal based on the motion vector corrected by the refinement unit 111C in a case where the motion vector is corrected.

Figure 8:
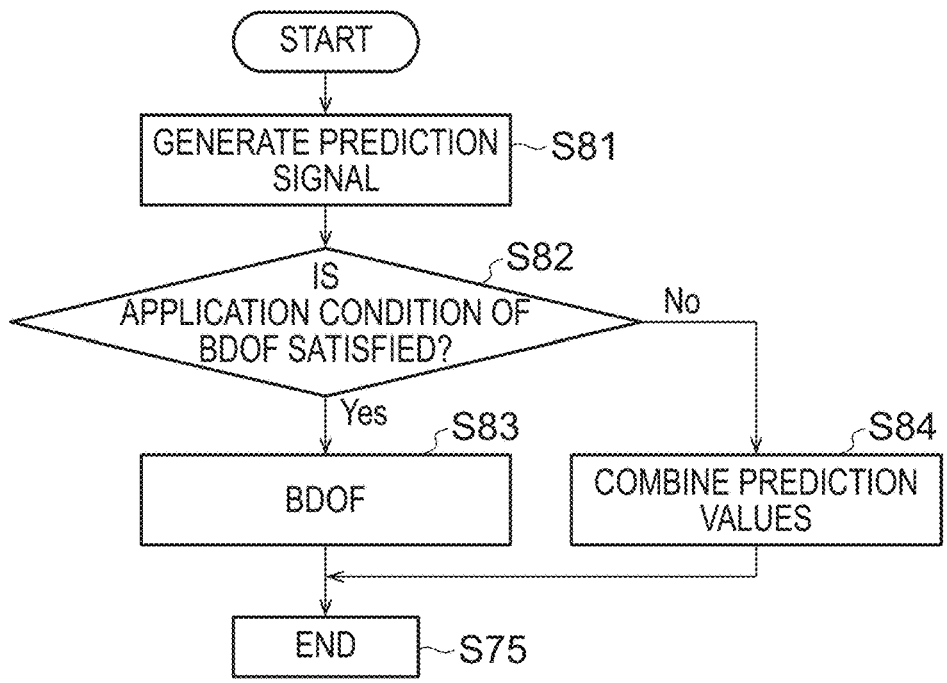
FIG. 8 is a flowchart illustrating an example of a processing procedure of a prediction signal generation unit 111D of the inter-prediction unit 111 of the image encoding device 100 according to the embodiment.

FIG. 8 is a flowchart illustrating an example of a processing procedure of the prediction signal generation unit 111D. Here, in a case where the refinement unit 111C performs the refinement processing in units of sub-blocks, processing of the prediction signal generation unit 111D is also executed in units of sub-blocks. In this case, the term "block" in the following description may be appropriately replaced with a sub-block.

As illustrated in FIG. 8, in step S81, the prediction signal generation unit 111D generates a prediction signal.

Specifically, the motion vector encoded by the motion vector encoding unit 111B or the motion vector encoded by the refinement unit 111C is input to the prediction signal generation unit 111D, and in a case where a position indicated by the motion vector is a non-integer pixel position, the prediction signal generation unit 111D interpolates a pixel at a non-integer pixel position by applying a filter to the pixel value of the reference frame. Here, as a specific filter, a horizontal/vertical separable filter having maximum 8 taps that is disclosed in Non Patent Literature 1 may be applied.

In a case where the block is a block on which bi-prediction is performed, the prediction signal generation unit 111D generates both of a prediction signal based on the reference frame and the motion vector of the first set (hereinafter, referred to as L0) and a prediction signal based on the reference frame and the motion vector of the second set (hereinafter, referred to as L1).

In step S82, the prediction signal generation unit 111D confirms whether or not an application condition of the BDOF processing to be described later is satisfied for each block.

The application condition includes at least a condition that the block is a block on which bi-prediction is performed.

Further, the application condition may include a condition that, in the search of the integer pixel position by the refinement unit 111C in step S73, the search cost of the search point having the lowest search cost is higher than a predetermined threshold value or is equal to or higher than a predetermined threshold value.

Further, the predetermined condition may include a condition that, in the SPS 141 of the sequence to which the block belongs, a value of the flag "sps_bdof_enabled_flag" indicates that BDOF is enabled in the sequence (for example, a value of the flag is "1").

Further, the application condition may include a condition that, in the slice header 143A/143B of the slice to which the block belongs, a value of the flag "slice_disable_bdof_dmvr_prof_flag" indicates that BDOF processing is enabled in the slice (for example, a value of the flag is "0").

Further, the application condition may include a condition that one of the reference frame of L0 and the reference frame of L1 is a previous frame in time with respect to the target frame, that the other reference frame is a next frame in time with respect to the target frame, and that a ratio between L0 and L1 in a time distance from the target frame (for example, an absolute value of a difference in POC) is a predetermined ratio.

Here, in a method of determining the ratio, the ratio may be determined so as to be proportional to, for example, a reciprocal of a weight coefficient when calculation is performed using a gradient between L0 and L1 or a brightness value in the BDOF processing to be described later.

For example, in a case where a weight coefficient of L0 is set to "⅔" and a weight coefficient of L1 is set to "⅓", when a distance between L0 and the target frame is set to "1" as a ratio of a distance between the reference frames, the BDOF processing may be applied only in a case where a distance between L1 and the target frame is set to "2".

Similarly, for example, in a case where a weight coefficient of L0 is set to "½" and a weight coefficient of L1 is set to "½", when a distance between L0 and the target frame is set to "1" as a ratio of a distance between the reference frames, the BDOF processing may be applied only in a case where a distance between L1 and the target frame is set to "1", that is, only in a case where the distance between each of L0 and L1 and the target frame is the same.

That is, the prediction signal generation unit 111D may set, as the application condition, a condition on the time distances between the two reference frames (L0/L1) and the target frame, the time distances being proportional to the reciprocal of the weight coefficient in a case where calculation is performed using pixel values of the two reference frames (L0/L1) or values calculated from the pixel values of the two reference frames (L0/L1).

Further, in a case where the weight coefficient is the same, the prediction signal generation unit 111D may set, as the application condition, a condition on the time distances indicating that the time distances between each of the two reference frames (L0/L1) and the target frame is the same.

Here, a case where the weight coefficient is set to "½" has been described as an example. On the other hand, in a case where the same weight (for example, "1" may be used) is used for L0 and L1, the BDOF processing may be applied only in a case where the distance between the frame and each of L0 and L1 is the same.

In a case where it is determined that the application condition is satisfied, the processing procedure proceeds to step S83, and in a case where the application condition is not satisfied, the processing procedure proceeds to step S84.

In step S83, the prediction signal generation unit 111D generates a prediction signal by executing the BDOF processing. For the BDOF processing, a known method may be used. Thus, only an outline thereof will be described, and a detailed description thereof will be omitted.

Firstly, the prediction signal generation unit 111D calculates a gradient of the brightness value in the vertical direction and the horizontal direction for each pixel in the reference block of the block. As a specific calculation method, for example, the calculation method described in Non Patent Literature 1 may be used. Here, a horizontal gradient of L0 is referred to as "gradientHL0", a vertical gradient of L0 is referred to as "gradientVL0", a horizontal gradient of L1 is referred to as "gradientHL1", and a vertical gradient of L1 is referred to as "gradientVL1".

Secondly, the prediction signal generation unit 111D calculates a corrected MV(vx, vy) of the block. As a specific calculation method, for example, the calculation method described in Non Patent Literature 1 may be used. Here, a sum (tempH, tempV) of the gradients and a brightness value difference (diff) between the reference blocks of L0 and L1 may be calculated as follows, and may be used for calculation of (vx, vy) as described in Non Patent Literature 1.

$$diff = predSampleL0 \times weightL0 - predSampleL1 \times weightL1$$

$$tempH = gradientHL0 \times weightL0 + gradientHL1 \times weightL1$$

$$tempV = gradientVL0 \times weightL0 + gradientVL1 \times weightL1$$

Here, "predSampleL0" and "predSampleL1" are the brightness values of the reference blocks of L0 and L1, and "weightL0" and "weightL1" are the weight coefficients in calculation of the gradient and the brightness value difference.

Here, an example in which a common weight is used for the three parameters "diff", "tempH", and "tempV" has been described as an example. On the other hand, similar weights may be set as long as addition, subtraction, multiplication, or division is performed on information of L0 and information of L1.

Further, as described above, the application condition on the distance from the reference frame in the BDOF processing may be set in proportion to the reciprocal of the weight. In other words, as described above, the weight in addition, subtraction, multiplication, or division may be set to be proportional to the reciprocal of the ratio of the distance between the target frame and each of the reference frames of L0 and L1.

By the setting, in a case where it is assumed that the gradient or the brightness value is linearly changed between L0 and L1, an appropriate weight coefficient can be set at a position of the target frame in time. In addition, by setting the application condition of the BDOF processing in correspondence with the weight coefficient, it is possible to ensure that an appropriate weight coefficient is always used.

Thirdly, the prediction signal generation unit 111D calculates a brightness value correction amount "bdofOffset" for each pixel as follows, for example, using the gradient and the corrected MV which are obtained above.

$$bdofOffset = vx \times (weightL0 \times gradientHL0 - weightL1 \times gradientHL1) +$$
$$vy \times weightL0 \times gradientVL0 - weightL1 \times gradientVL1)$$

Fourthly, the prediction signal generation unit 111D can calculate a prediction value of a corrected brightness value of each pixel, for example, using "bdofOffset" as described in Non Patent Literature 1.

That is, the prediction signal generation unit 111D is configured to set, as the application condition, in the BDOF processing, a condition on the time distances between the two reference frames and the target frame, based on the weight coefficient in a case where calculation is performed using pixel values of the two reference frames (L0/L1) or values calculated from the pixel values of the two reference frames (L0/L1).

After the BDOF processing is performed, the processing procedure proceeds to step S85, and the processing is ended.

In step S84, in a case where the block is a block on which bi-prediction is performed, the prediction signal generation unit 111D generates a final prediction signal by combining the prediction signals of L0 and L1 generated in step S81. As a specific combination method, a known method may be used. Thus, details thereof will be omitted. In a case where the block is a block on which uni-prediction is performed, the prediction signal generation unit 111D sets, as a final prediction signal, the prediction signal generated in step S81 as it is.

After the prediction signal generation unit 111D generates the final prediction signal by the procedure, the process proceeds to step S85, and the processing is ended.

In a case where the motion vector search unit 111A determines to perform affine motion compensation on the block, the affine motion vector calculation unit 111E is configured to calculate a motion vector for each sub-block obtained by dividing the block, based on the control point motion vector encoded by the motion vector encoding unit 111B.

Figure 9:
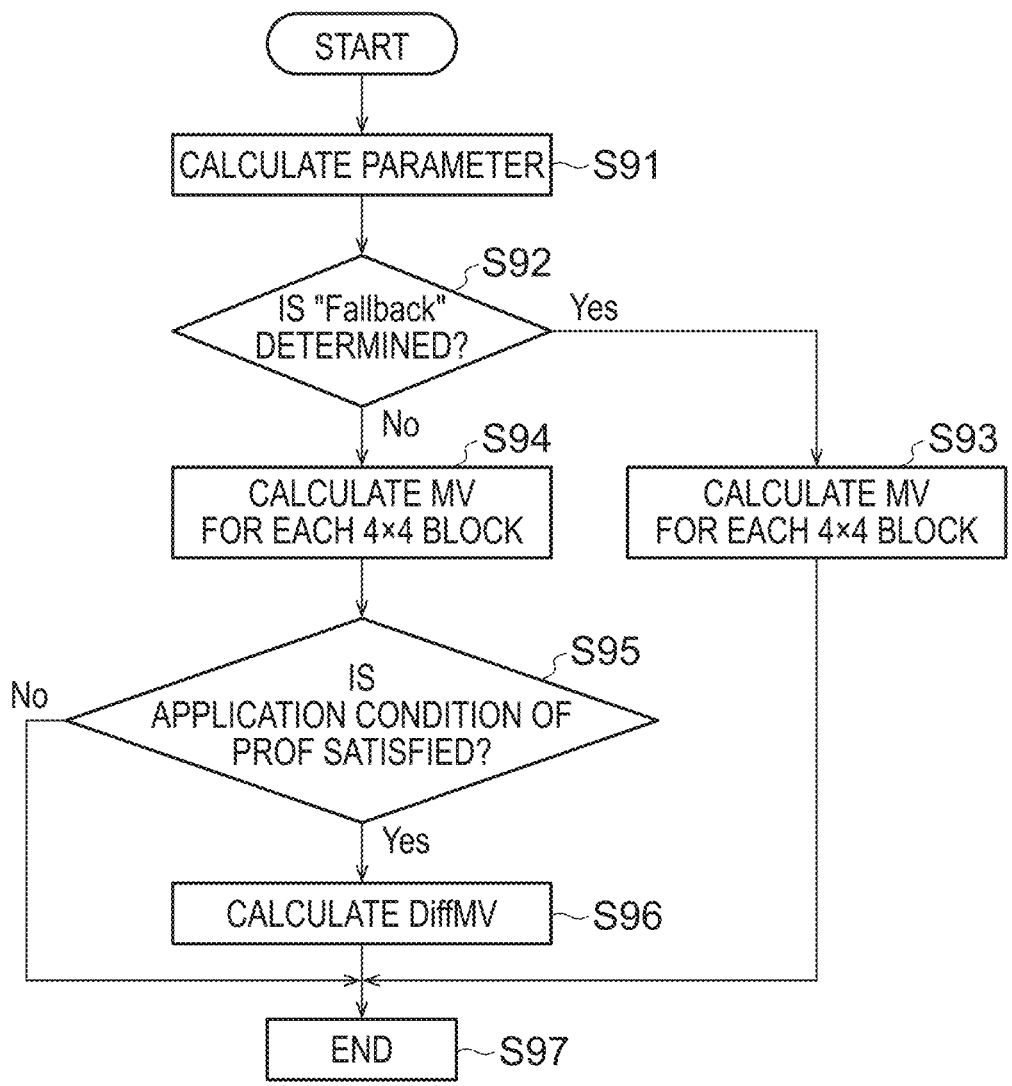
FIG. 9 is a flowchart illustrating an example of a processing procedure of an affine motion vector calculation unit 111E of the inter-prediction unit 111 of the image encoding device 100 according to the embodiment.

FIG. 9 is a flowchart illustrating an example of a processing procedure of the affine motion vector calculation unit 111E.

As illustrated in FIG. 9, in step S91, the affine motion vector calculation unit 111E calculates values of total four parameters of "dHorX", "dHorY", "dVerX", and "dVerY".

Here, the affine motion vector calculation unit 111E uses, for calculation of the parameters, a value of the control point motion vector encoded by the motion vector encoding unit 111B.

Figure 10:
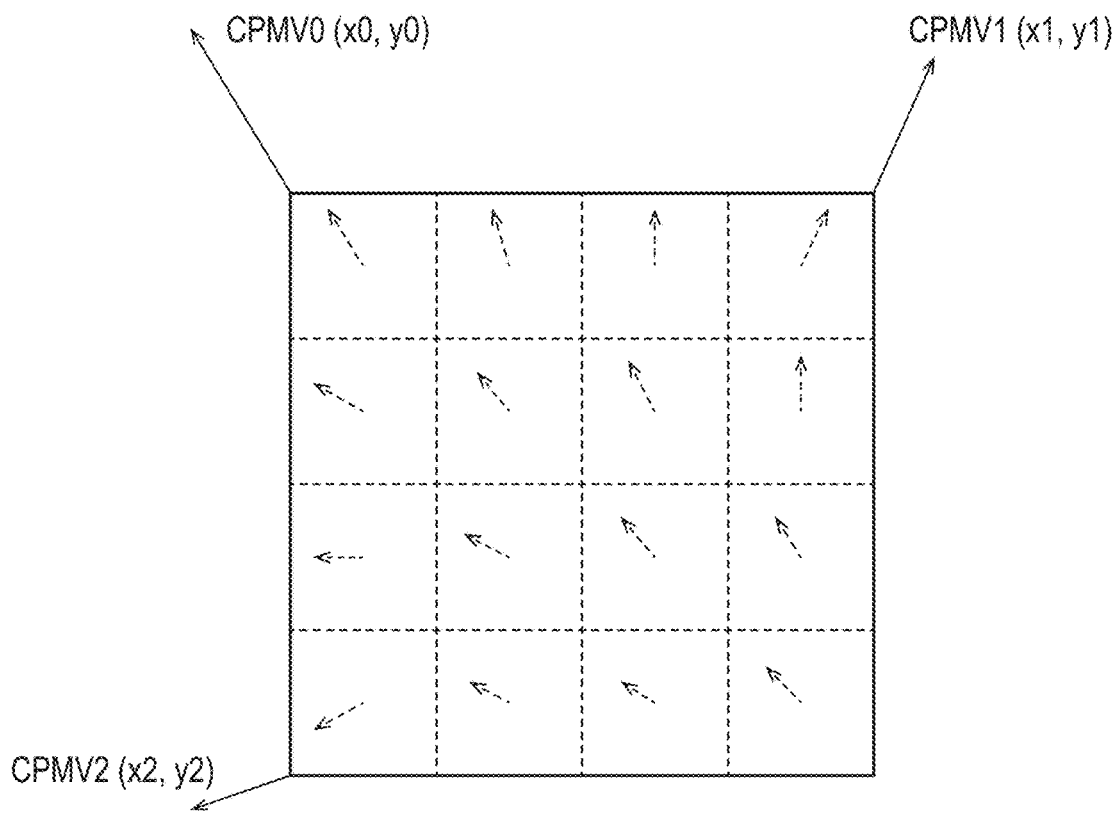
FIG. 10 is a diagram for explaining an example of a processing procedure of the affine motion vector calculation unit 111E of the inter-prediction unit 111 of the image encoding device 100 according to the embodiment.

As described above, two or three control point motion vectors exist for each block. FIG. 10 illustrates an example in a case where three control point motion vectors ("CPMV0", "CPMV1", and "CPMV2") exist.

Here, in FIG. 10, a solid line indicates a boundary of the block, a dotted line indicates a boundary of a sub-block obtained by dividing the block, a solid-line arrow indicates a control point motion vector, and a dotted-line arrow indicates a motion vector of each sub-block.

In a case where two control point motion vectors exist, only CPMV0 and CPMV1 in FIG. 10 exist. As a specific method for calculating the values of the total four parameters of "dHorX", "dHorY", "dVerX", and "dVerY" from the values of the control point motion vectors, a known method may be used. Thus, a detailed description thereof will be omitted.

In step S92, the affine motion vector calculation unit 111E determines whether to apply "fallbackMode" to the block.

Here, "fallbackMode" is a mode in which the same motion vector is used for all the sub-blocks obtained by dividing the block. As a method of determining "fallbackMode", a known method may be used. Thus, a detailed description thereof will be omitted. In a case where "fallbackMode" is applied to the block, the processing procedure proceeds to step S93, and in a case where "fallbackMode" is not applied to the block, the processing procedure proceeds to step S94.

In step S93, the affine motion vector calculation unit 111E calculates a motion vector of each sub-block in a case where "fallbackMode" is used.

As described above, in the case of "fallbackMode", the values of the motion vectors of all the sub-blocks in the same block are the same. As a specific calculation method, a known method may be used. Thus, a detailed description thereof will be omitted.

For example, in Non Patent Literature 1, a motion vector is calculated by inputting, to a predetermined model, the values of "dHorX", "dHorY", "dVerX", and "dVerY" described above and coordinate values of a center of the block (values obtaining by dividing a height and a width of the block by "½") when an upper left coordinate value of the block is set as the origin. In the processing procedure, after step S93 is completed, the process proceeds to step S97, and the processing is ended.

In step S94, the affine motion vector calculation unit 111E calculates a motion vector of each sub-block in a case where "fallbackMode" is not applied. As a specific calculation method, a known method may be used. Thus, a detailed description thereof will be omitted.

For example, in Non Patent Literature 1, a motion vector is calculated by inputting, to a predetermined model, the values of "dHorX", "dHorY", "dVerX", and "dVerY" and coordinate values of a center of each sub-block when an upper left coordinate value of the block is set as the origin. After step S94 is completed, the processing procedure proceeds to step S95.

In step S95, the affine motion vector calculation unit 111E determines whether or not the condition for applying the PROF processing to the block is satisfied.

The application condition may include a condition that a value of "sps_affine_prof_enabled_flag" is "1".

Further, the application condition may include a condition that a value of the flag "slice_disable_bdof_dmvr_prof_flag" indicates that PROF processing is enabled in the slice (for example, a value of the flag is "0").

Further, the application condition may include a condition that "fallbackMode" is not applied to the block.

In a case where it is determined that all the application conditions are satisfied, the affine motion vector calculation unit 111E determines to apply the PROF processing to the block, and the processing procedure proceeds to step S96. Otherwise, the affine motion vector calculation unit 111E determines not to apply the PROF processing to the block. The processing procedure proceeds to step S97, and the processing is ended.

In the embodiment, an example in which the affine motion vector calculation unit 111E determines whether or not all the application conditions are satisfied has been described. On the other hand, the affine motion vector calculation unit 111E may perform the determination by another logically-equivalent method.

Specifically, all the application conditions are reversed, and non-application conditions of the PROF processing are defined. In a case where any one of the non-application conditions is satisfied, the affine motion vector calculation unit 111E may determine not to apply the PROF processing to the block, and the process may proceed to step S97. In a case where any one of the non-application conditions is not satisfied, the affine motion vector calculation unit 111E may determine to apply the PROF processing to the block, and the process may proceed to step S96.

The non-application condition of the PROF processing corresponding to the example may be defined as follows.

The non-application condition may include a condition that a value of the flag "sps_affine_prof_enabled_flag" is "0".

Further, the non-application condition may include a condition that a value of the flag "slice_disable_bdof_dmvr_prof_flag" indicates that PROF processing is disabled in the slice (for example, a value of the flag is "1").

Further, the non-application condition may include a condition that "fallbackMode" is applied to the block.

In step S96, the affine motion vector calculation unit 111E calculates a value of "diffMV" used in the PROF processing. For example, the value of "diffMV" is calculated for each pixel position when an upper left coordinate of each sub-block is set as the origin. In a case where a size of each sub-block in the block is the same (for example, 4×4 pixel), when "diffMV" for each pixel position of one sub-block is calculated, the value may be used for other sub-blocks.

For example, "diffMV" may be calculated as follows.

$$diffMV[x][y][0] = x \times (dHorX \ll 2) + y \times (dVerX \ll 2) - posOffsetX$$

$$diffMV[x][y][1] = x \times (dHorY \ll 2) + y \times (dVerY \ll 2) - posOffsetY$$

Here, x and y mean each pixel position (x, y) when the upper left coordinate of each sub-block is set as the origin,

[0] means an x-direction component of "diffMV", and [1] means a y-direction component of "diffMV".

The following relationship is established.

$$posOffsetX = 6 \times dHorX + 6 \times dVerX$$
$$posOffsetY = 6 \times dHorY + 6 \times dVerY$$

Thereafter, the affine motion vector calculation unit 111E performs right shift and clipping processing as described in Non Patent Literature 1.

After "diffMV" is calculated, the processing procedure proceeds to step S97, and the processing is ended.

The above description is processing for one reference frame of the block. For example, in the case of bi-prediction with two reference frames, processing of step S91 to step S97 is executed for L0 and L1. Therefore, a determination result on whether or not the PROF processing is applied and a calculation result of "diffMV" may be different for L0 and L1.

Figure 11:
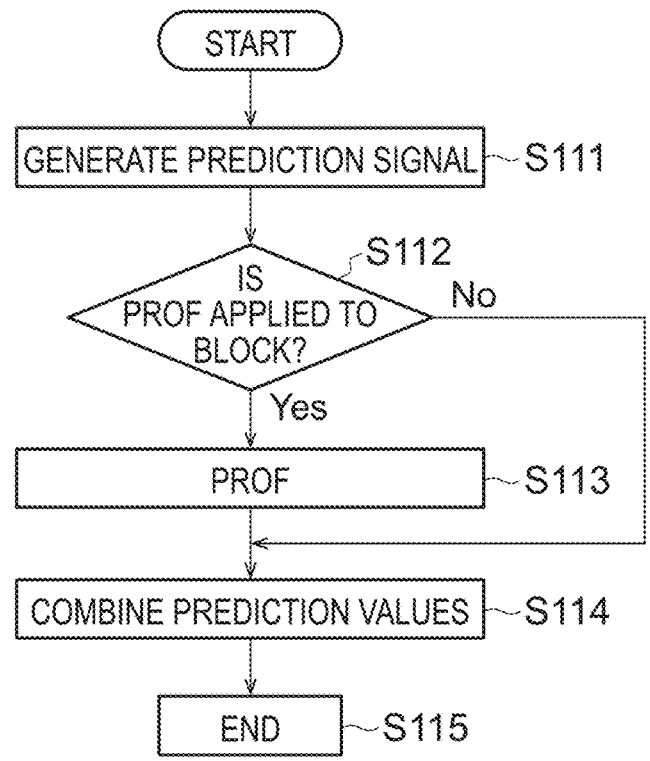
FIG. 11 is a flowchart illustrating an example of a processing procedure of an affine prediction signal generation unit 111F of the inter-prediction unit 111 of the image encoding device 100 according to the embodiment.

FIG. 11 is a flowchart illustrating an example of processing of the affine prediction signal generation unit 111F.

The affine prediction signal generation unit 111F is configured to perform the PROF processing in a case where "slice_disable_bdof_dmvr_prof_flag" indicates that the PROF processing is enabled in the slice corresponding to the slice header (in a case where the value of the flag is "0") and generate a prediction signal without performing the PROF processing in a case where "slice_disable_bdof_dmvr_prof_flag" indicates that the PROF processing is disabled (in a case where the value of the flag is "0").

In a case where "slice_disable_bdof_dmvr_prof_flag" is not included in the slice header, the affine prediction signal generation unit 111F may be configured to implicitly interpret that the flag indicates that the processing is enabled (the value of the flag is "0") and perform the processing.

In step S111, the affine prediction signal generation unit 111F generates a prediction signal.

Specifically, the motion vector for each sub-block that is calculated by the affine motion vector calculation unit 111E is input to the affine prediction signal generation unit 111F, and in a case where a position indicated by the motion vector is a non-integer pixel position, the affine prediction signal generation unit 111F interpolates a pixel at a non-integer pixel position by applying a filter to the pixel value of the reference frame. Here, as a specific filter, a horizontal/vertical separable filter having maximum 6 taps that is disclosed in Non Patent Literature 1 may be applied.

In a case where the block is a block on which bi-prediction is performed, the affine prediction signal generation unit 111F generates both of a prediction signal of L0 and a prediction signal of L1.

In step S112, the affine prediction signal generation unit 111F determines whether to apply the PROF processing in a prediction direction (L0 or L1) of the block. For the determination, the determination result in step S95 is used as it is.

In a case where it is determined that the PROF processing is applied in the prediction direction of the block, the processing procedure proceeds to step S113. On the other hand, when it is determined that the PROF processing is not applied in the prediction direction of the block, the processing procedure proceeds to step S114.

In step S113, the affine prediction signal generation unit 111F executes the PROF processing. As a specific processing method for the PROF processing, a known method may be used. Thus, details thereof will be omitted. The affine prediction signal generation unit 111F performs correction of the prediction signal by the PROF processing.

In step S114, in a case where the block is a block on which bi-prediction is performed, the affine prediction signal generation unit 111F generates a final prediction signal by combining the prediction signals of L0 and L1 generated in step S111 or the prediction signals obtained by correcting the prediction signals in step S113. As a specific combination method, a known method may be used. Thus, details thereof will be omitted. In a case where the block is a block on which uni-prediction is performed, the affine prediction signal generation unit 111F sets, as a final prediction signal, the prediction signal generated in step S111 or the prediction signal obtained by correcting the prediction signal in step S113 as it is.

After generation of the final prediction signal is completed, the processing procedure proceeds to step S115, and the processing is ended.

In the example, for the sake of convenience, the prediction signal generation unit 111D and the affine prediction signal generation unit 111F have been described as different processing blocks. On the other hand, a part of pieces of processing may be made common, and the prediction signal generation unit 111D and the affine prediction signal generation unit 111F may be configured with a single processing block.

For example, processing of step S81 and processing of step S111 may be regarded as the same processing, and processing of step S84 and processing of step S114 may be regarded as the same processing.

In this case, after it is determined that the determination in step S82 of FIG. 8 is No, in a case where step S112, step S113, and step S114 of FIG. 10 are sequentially executed, the flowcharts of FIG. 8 and FIG. 10 may be integrated and regarded as a single processing block. At this time, the BDOF processing and the PROF processing are exclusively applied in units of blocks.

(In-Loop Filter Processing Unit 150)

Figure 12:
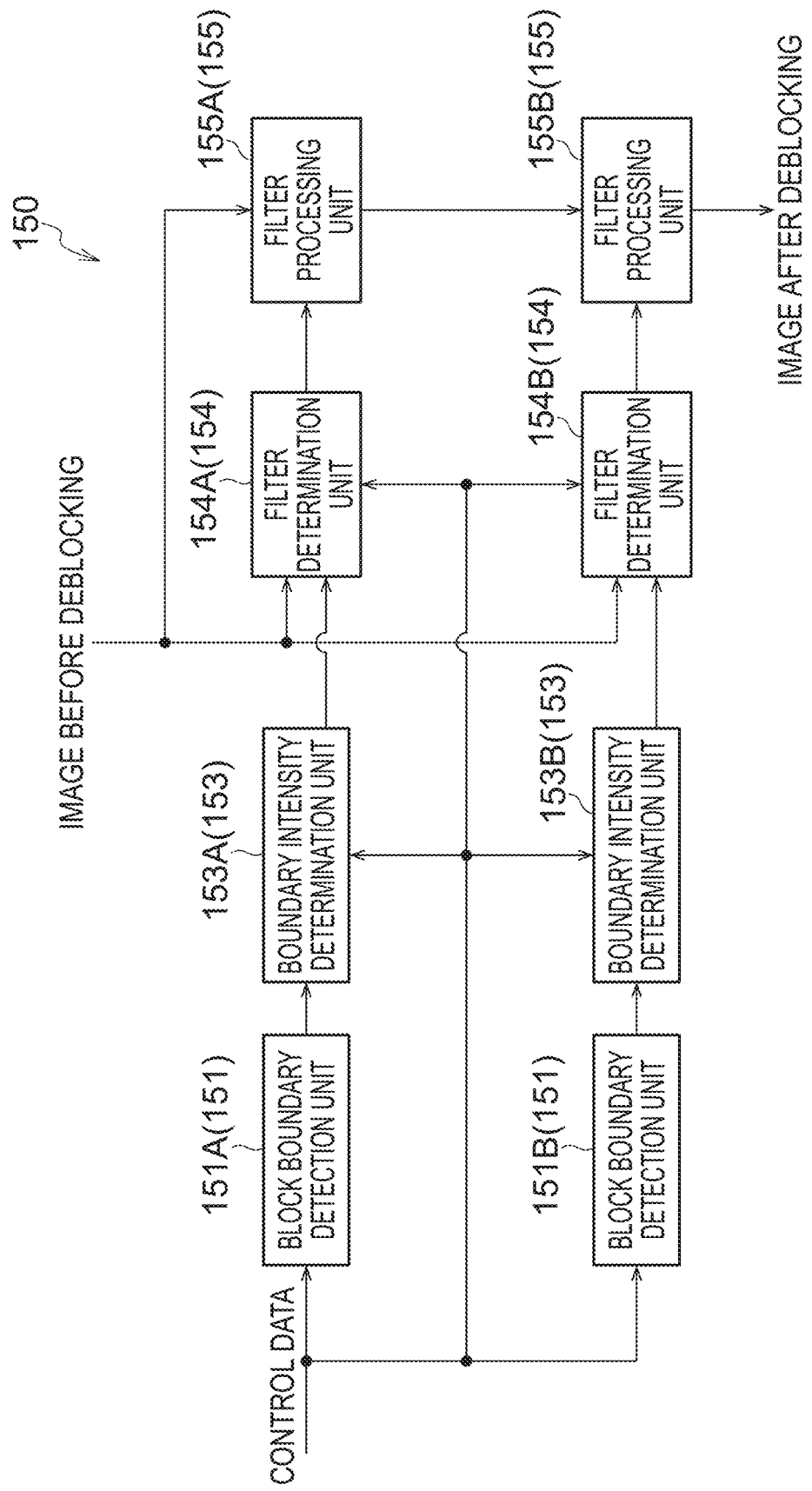
FIG. 12 is a diagram illustrating an example of functional blocks of an in-loop filter processing unit 150 of the image encoding device 100 according to the embodiment.

Hereinafter, the in-loop filter processing unit 150 according to the present embodiment will be described. FIG. 12 is a diagram illustrating the in-loop filter processing unit 150 according to the present embodiment.

As illustrated in FIG. 12, the in-loop filter processing unit 150 includes a block boundary detection unit 151, a boundary intensity determination unit 153, a filter determination unit 154, and a filter processing unit 155.

Here, a configuration with "A" at the end is a configuration related to deblocking filter processing for a block boundary in the vertical direction, and a configuration with "B" at the end is a configuration related to deblocking filter processing for a block boundary in the horizontal direction.

Hereinafter, a case where deblocking filter processing for a block boundary in the vertical direction is performed and then deblocking filter processing for a block boundary in the horizontal direction is performed will be described.

The deblocking filter processing may be applied to an encoding block as described above, may be applied to a prediction block, or may be applied to a transformation block. Further, the deblocking filter processing may be applied to sub-blocks obtained by dividing each block. That is, a target block and an adjacent block may be encoding blocks, may be prediction blocks, may be transformation blocks, or may be sub-blocks obtained by dividing the blocks.

A definition of the sub-blocks includes the sub-blocks described as the units of processing of the refinement unit 111C and the prediction signal generation unit 111D. Further, a definition of the sub-blocks includes the sub-blocks described as the units of processing of the affine motion vector calculation unit 111E and the affine prediction signal generation unit 111E. In a case where the deblocking filter is applied to the sub-block, the block in the following description may be appropriately replaced with the sub-block.

The deblocking filter processing for the block boundary in the vertical direction and the deblocking filter processing for the block boundary in the horizontal direction are the same processing. Thus, in the following description, the deblocking filter processing for the block boundary in the vertical direction will be described.

The block boundary detection unit 151A is configured to detect a boundary between the blocks based on control data indicating a block size. Here, the block is an encoding block (CU), a prediction block (PU), or a transformation block (TU). As a specific detection method, a known method may be applied. Thus, a detailed description thereof will be omitted.

The boundary intensity determination unit 153A is configured to determine a boundary intensity of a block boundary between a target block and an adjacent block.

Further, the boundary intensity determination unit 153A may be configured to determine a boundary intensity of a block boundary based on control data indicating whether or not the target block and the adjacent block are intra-prediction blocks.

For example, as illustrated in FIG. 13, in a case where at least one block of the target block and the adjacent block is an intra-prediction block (that is, in a case where at least one of the blocks on both sides of the block boundary is an intra-prediction block), the boundary intensity determination unit 153A may be configured to determine that the boundary intensity of the block boundary is "2".

Further, the boundary intensity determination unit 153A may be configured to determine a boundary intensity of a block boundary based on control data indicating whether or not a non-zero orthogonal transformation coefficient is included in the target block and the adjacent block and whether or not the block boundary is a boundary of the transformation block.

For example, as illustrated in FIG. 13, in a case where at least one block of the target block and the adjacent block includes a non-zero orthogonal transformation coefficient and the block boundary is a boundary of the transformation block (that is, in a case where a non-zero transformation coefficient exists in at least one of the blocks on both sides of the block boundary and the block boundary is a boundary of the transformation block TU), the boundary intensity determination unit 153A may be configured to determine that the boundary intensity of the block boundary is "1".

Further, the boundary intensity determination unit 153A may be configured to determine a boundary intensity of a block boundary based on control data indicating whether or not an absolute value of a difference between the motion vectors of the target block and the adjacent block is equal to or larger than a threshold value (for example, ½ pixel).

For example, as illustrated in FIG. 13, in a case where an absolute value of a difference between the motion vectors of the target block and the adjacent block is equal to or larger than a threshold value (for example, ½ pixel) (that is, an absolute value of a difference between the motion vectors of the blocks on both sides of the block boundary is equal to or larger than a threshold value (for example, ½ pixel)), the boundary intensity determination unit 153A may be configured to determine that the boundary intensity of the block boundary is "1".

Further, the boundary intensity determination unit 153A may be configured to determine a boundary intensity of a block boundary based on control data indicating whether or not reference blocks referred to in the prediction of the motion vectors of the target block and the adjacent block are different from each other.

For example, as illustrated in FIG. 13, in a case where reference blocks referred to in the prediction of the motion vectors of the target block and the adjacent block are different from each other (that is, in a case where reference images are different from each other in the blocks on both sides of the block boundary), the boundary intensity determination unit 153A may be configured to determine that the boundary intensity of the block boundary is "1".

The boundary intensity determination unit 153A may be configured to determine a boundary intensity of a block boundary based on control data indicating whether or not the number of the motion vectors of the target block and the number of the motion vectors of the adjacent block are different from each other.

For example, as illustrated in FIG. 13, in a case where the number of the motion vectors of the target block and the number of the motion vectors of the adjacent block are different from each other (that is, in a case where the number of the motion vectors differs in the blocks on both sides of the block boundary), the boundary intensity determination unit 153A may be configured to determine that the boundary intensity of the block boundary is "1".

For example, as illustrated in FIG. 13, the boundary intensity determination unit 153A may be configured to determine that the boundary intensity of the block boundary is "0" in a case where none of the conditions is satisfied.

As a value of the boundary intensity is larger, a larger block distortion is likely to occur at the block boundary.

In the boundary intensity determination method, a brightness signal and a chrominance signal may be determined by a common method, or may be determined using a condition of which a part is different.

The filter determination unit 154A is configured to determine a type of filter processing (for example, deblocking filter processing) to be applied to the block boundary.

For example, the filter determination unit 154A may be configured to determine whether or not to apply the filter processing to the block boundary and whether or not to apply either weak filter processing or strong filter processing to the block boundary, based on the boundary intensity of the block boundary and quantization parameters included in the target block and the adjacent block.

The filter determination unit 154A may be configured to determine not to apply the filter processing in a case where the boundary intensity of the block boundary is "0".

The filter processing unit 155A is configured to perform processing on the image before deblocking based on the determination of the filter determination unit 154A. The processing on the image before deblocking includes no filter processing, weak filter processing, strong filter processing, and the like.

(Image Decoding Device 200)

Figure 14:
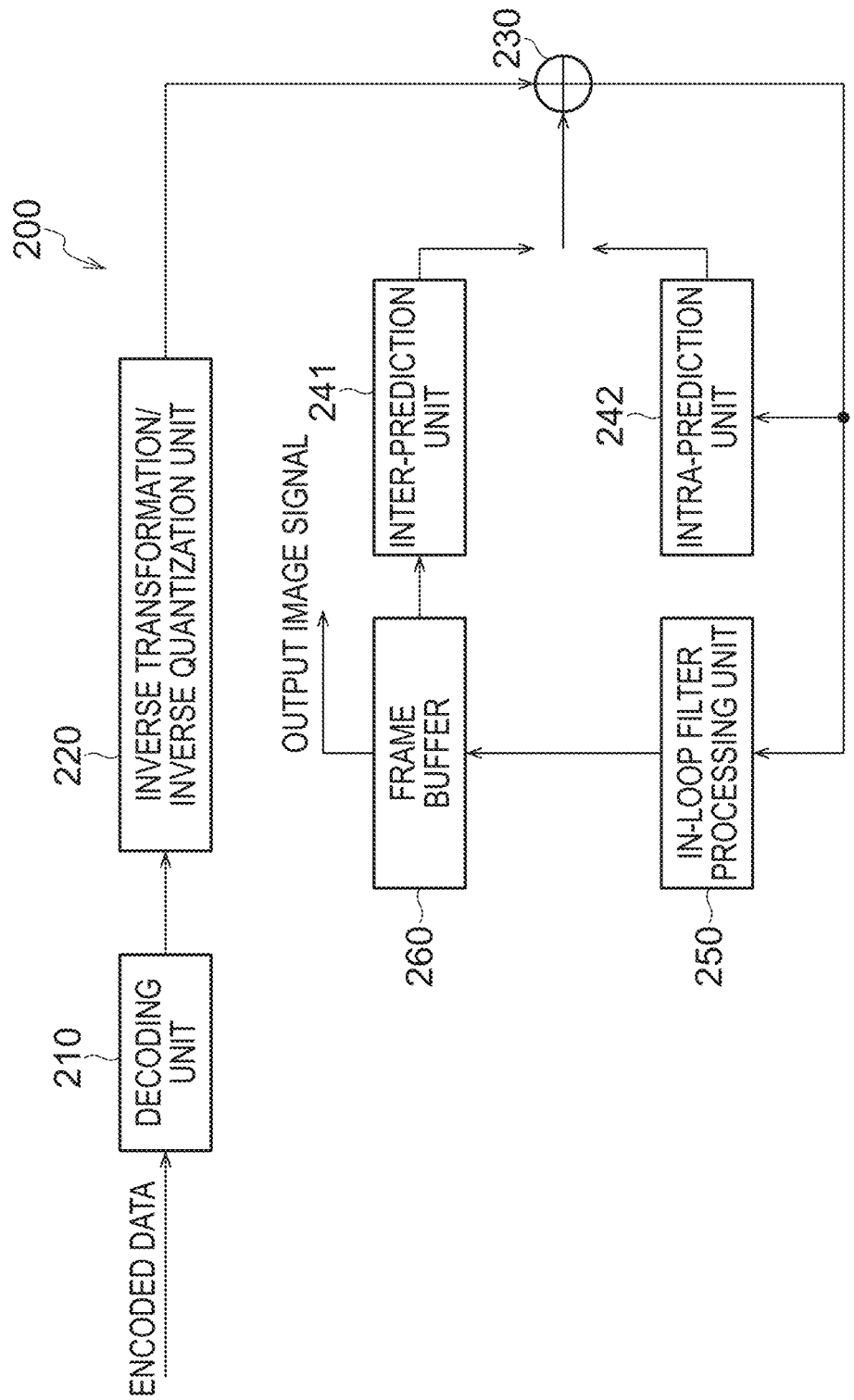
FIG. 14 is a diagram illustrating an example of functional blocks of an image decoding device 200 according to the embodiment.

Hereinafter, the image decoding device 200 according to the present embodiment will be described with reference to FIG. 14. FIG. 14 is a diagram illustrating an example of functional blocks of the image decoding device 200 according to the present embodiment.

As illustrated in FIG. 14, the image decoding device 200 includes a decoding unit 210, an inverse transformation/inverse quantization unit 220, an adder 230, an inter-prediction unit 241, an intra-prediction unit 242, an in-loop filter processing unit 250, and a frame buffer 260.

The decoding unit 210 is configured to decode the encoded data generated by the image encoding device 100 and decode a coefficient level value.

Here, for example, the decoding is entropy decoding with a procedure opposite to a procedure of entropy encoding performed by the encoding unit 140.

Further, the decoding unit 210 may be configured to acquire the control data by decoding processing of the encoded data.

As described above, the control data may include size data such as a size of the encoded block, a size of the prediction block, and a size of the transformation block.

Further, as described above, the control data may include header information such as a sequence parameter set (SPS), a picture parameter set (PPS), and a slice header.

For example, the decoding unit 210 may be configured to decode, from the slice header, a flag for controlling enabling/disabling of the PROF processing, a flag for collectively controlling enabling/disabling of the DMVR processing, the BDOF processing, and the PROF processing, or the like.

The inverse transformation/inverse quantization unit 220 is configured to perform inverse transformation processing of the coefficient level value which is output from the decoding unit 210. Here, the inverse transformation/inverse quantization unit 220 may be configured to perform inverse quantization of the coefficient level value prior to the inverse transformation processing.

Here, the inverse transformation processing and the inverse quantization are performed in a procedure opposite to a procedure of the transformation processing and the quantization performed by the transformation/quantization unit 131.

The adder 230 is configured to generate a decoded signal before filter processing by adding the prediction signal to a prediction residual signal which is output from the inverse transformation/inverse quantization unit 220, and output the decoded signal before filter processing to the intra-prediction unit 242 and the in-loop filter processing unit 250.

Here, the decoded signal before filter processing is included in the reference block to be used by the intra-prediction unit 242.

Similarly to the inter-prediction unit 111, the inter-prediction unit 241 is configured to generate a prediction signal by inter-prediction (prediction between the frames).

Specifically, the inter-prediction unit 241 is configured to generate a prediction signal for each prediction block based on a motion vector decoded from the encoded data and a reference signal included in the reference frame. The inter-prediction unit 241 is configured to output the prediction signal to the adder 230.

Similarly to the intra-prediction unit 112, the intra-prediction unit 242 is configured to generate a prediction signal by intra-prediction (prediction in the frame).

Specifically, the intra-prediction unit 242 is configured to specify a reference block included in the target frame and generate a prediction signal for each prediction block based on the specified reference block. The intra-prediction unit 242 is configured to output the prediction signal to the adder 230.

Similarly to the in-loop filter processing unit 150, the in-loop filter processing unit 250 is configured to perform filter processing on the decoded signal before filter processing that is output from the adder 230 and output the decoded signal after filter processing to the frame buffer 260.

Here, for example, the filter processing is deblocking filter processing for reducing a distortion occurring at a boundary portion of a block (an encoding block, a prediction block, a transformation block, or a sub-block obtained by dividing the block).

Similarly to the frame buffer 160, the frame buffer 260 is configured to accumulate the reference frames to be used by the inter-prediction unit 241.

Here, the decoded signal after filter processing is included in the reference frame to be used by the inter-prediction unit 241.

(Inter-Prediction Unit 241)

Figure 15:
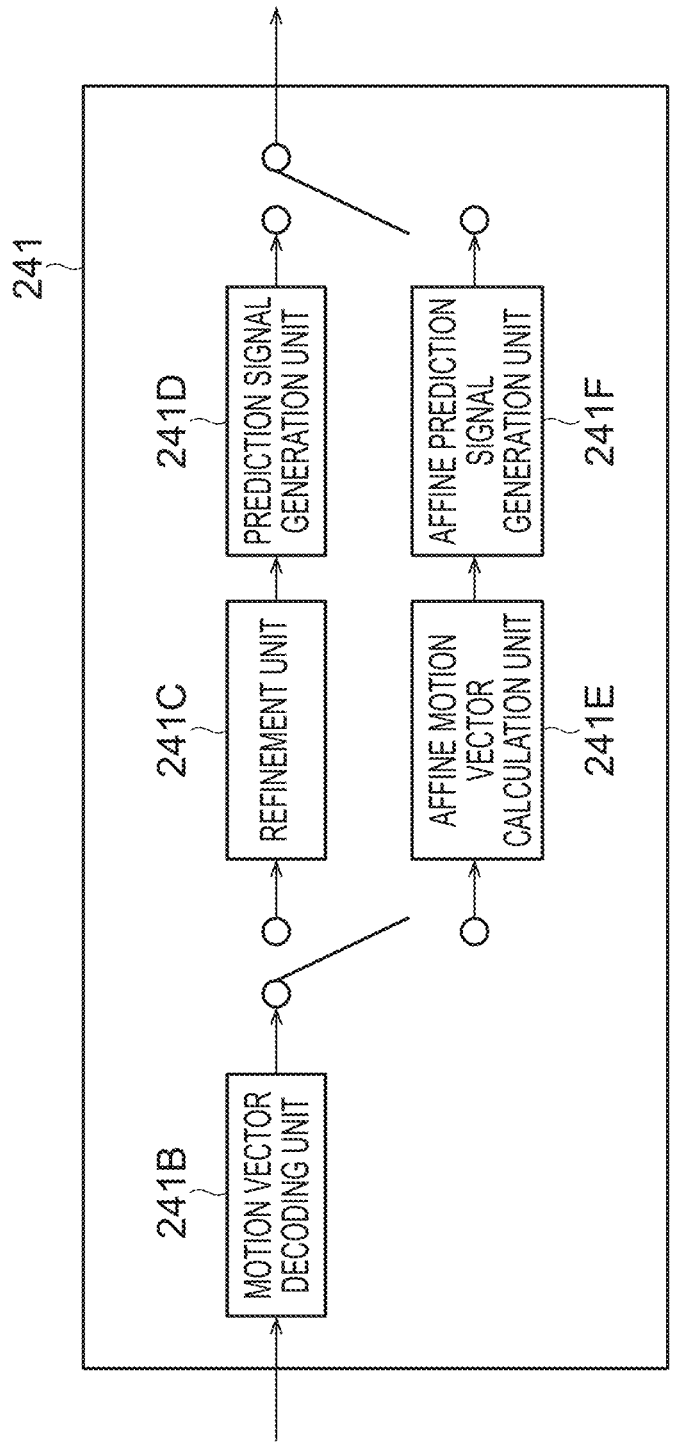
FIG. 15 is a diagram illustrating an example of functional blocks of an inter-prediction unit 241 of the image decoding device 200 according to the embodiment.

Hereinafter, the inter-prediction unit 241 according to the present embodiment will be described with reference to FIG. 15. FIG. 15 is a diagram illustrating an example of functional blocks of the inter-prediction unit 241 according to the present embodiment.

As illustrated in FIG. 15, the inter-prediction unit 241 includes a motion vector decoding unit 241B, a refinement unit 241C, a prediction signal generation unit 241D, an affine motion vector calculation unit 241E, and an affine prediction signal generation unit 241F.

The inter-prediction unit 241 is an example of a prediction unit configured to generate a prediction signal to be included in a prediction block based on a motion vector.

The motion vector decoding unit 241B is configured to acquire a motion vector by decoding the control data received from the image encoding device 100.

Further, the motion vector decoding unit 241B is configured to decode information on whether or not to enable the affine motion compensation in the block.

Here, in a case where the affine motion compensation is disabled in the block, processing of the refinement processing unit 241C and processing of the prediction signal generation unit 241D are performed, and in a case where the affine motion compensation is enabled in the block, processing of the affine motion vector calculation unit 241E and processing of the affine prediction signal generation unit 241F are performed.

Similarly to the refinement unit 111C, the refinement unit 241C is configured to execute refinement processing of correcting the motion vector.

Similarly to the prediction signal generation unit 111D, the prediction signal generation unit 241D is configured to generate a prediction signal based on the motion vector.

Similarly to the affine motion vector calculation unit 111E, the affine motion vector calculation unit 241E is configured to calculate the motion vector of each sub-block using the control point motion vector decoded by the motion vector decoding unit 241B.

Similarly to the affine prediction signal generation unit 111F, the affine prediction signal generation unit 241F generates a prediction signal using the motion vector of each sub-block calculated by the affine motion vector calculation unit 241E. Similarly to the prediction signal generation unit 111D and the affine prediction signal generation unit 111F, the affine prediction signal generation unit 241F may be integrated into the same processing block.

(In-Loop Filter Processing Unit 250)

Figure 16:
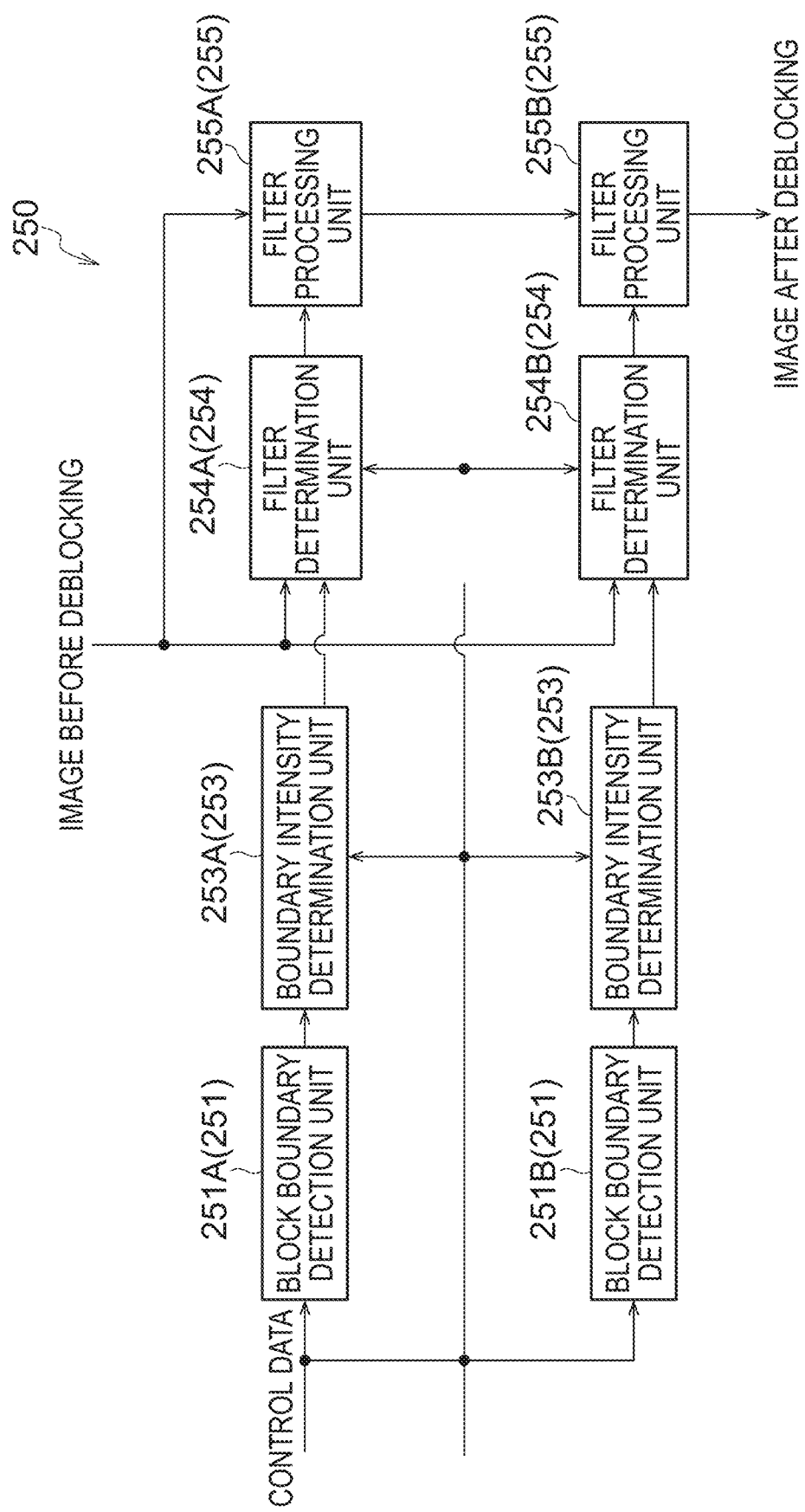
FIG. 16 is a diagram illustrating an example of functional blocks of an in-loop filter processing unit 250 of the image decoding device 200 according to the embodiment.

Hereinafter, the in-loop filter processing unit 250 according to the present embodiment will be described. FIG. 16 is a diagram illustrating the in-loop filter processing unit 250 according to the present embodiment.

As illustrated in FIG. 16, the in-loop filter processing unit 250 includes a block boundary detection unit 251, a boundary intensity determination unit 253, a filter determination unit 254, and a filter processing unit 255.

Here, a configuration with "A" at the end is a configuration related to deblocking filter processing for a block boundary in the vertical direction, and a configuration with "B" at the end is a configuration related to deblocking filter processing for a block boundary in the horizontal direction.

Here, a case where deblocking filter processing for a block boundary in the vertical direction is performed and then deblocking filter processing for a block boundary in the horizontal direction is performed will be described.

The deblocking filter processing may be applied to an encoding block as described above, may be applied to a prediction block, or may be applied to a transformation block. Further, the deblocking filter processing may be applied to sub-blocks obtained by dividing each block. That is, a target block and an adjacent block may be encoding blocks, may be prediction blocks, may be transformation blocks, or may be sub-blocks obtained by dividing the blocks.

The deblocking filter processing for the block boundary in the vertical direction and the deblocking filter processing for the block boundary in the horizontal direction are the same processing. Thus, in the following description, the deblocking filter processing for the block boundary in the vertical direction will be described.

Similarly to the block boundary detection unit 151A, the block boundary detection unit 251A is configured to detect a boundary between the blocks based on control data indicating a block size.

Similarly to the boundary intensity determination unit 153A, the boundary intensity determination unit 253A is configured to determine a boundary intensity of a block boundary between a target block and an adjacent block. A method of determining the boundary intensity of the block boundary is as described above.

Similarly to the filter determination unit 154A, the filter determination unit 254A is configured to determine a type of deblocking filter processing to be applied to the block boundary. A method of determining a type of deblocking filter processing is as described above.

Similarly to the filter processing unit 155A, the filter processing unit 255A is configured to perform processing on the image before deblocking based on the determination of the filter determination unit 254A. The processing on the image before deblocking includes no filter processing, weak filter processing, strong filter processing, and the like.

Modification Example 1

Hereinafter, Modification Example 1 according to the embodiment will be described with reference to FIG. 17 and FIG. 18. Hereinafter, differences from the embodiment will be mainly described. In the embodiment, a detailed description of each of the BDOF processing and the PROF processing is omitted. On the other hand, in the present modification example, an example of specific processing will be described.

Firstly, a specific example of the BDOF processing in step S83 will be described with reference to FIG. 17.

Figure 17:
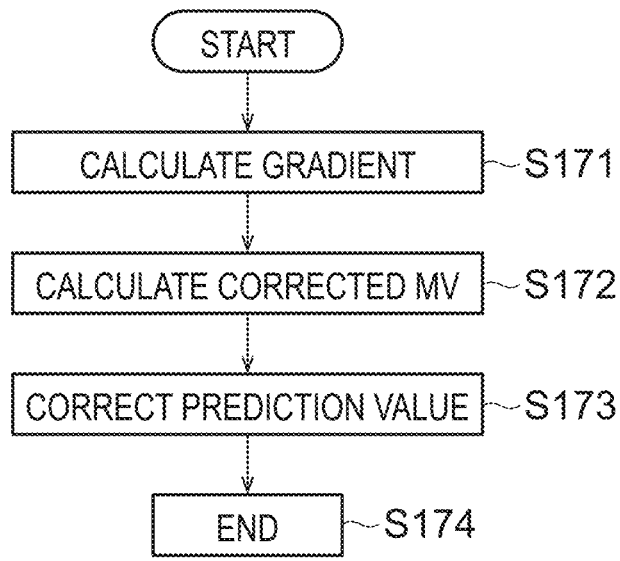
FIG. 17 is a diagram for explaining Modification Example 1.

As illustrated in FIG. 17, in step S171, the prediction signal generation unit 111D/241D calculates brightness value gradients in the horizontal direction and the vertical direction for each pixel in the reference blocks of L0 and L1 corresponding to the block or the sub-block to which the BDOF processing is applied.

Specifically, the prediction signal generation unit 111D/241D calculates the gradient for each pixel position (x, y) in the block by the following equation.

$$\text{gradient}HL0[x][y] = (predSamplesL0[hx+1][vy] \gg \text{shift1}) - $$
$$(predSamplesL0[hx-1][vy] \gg \text{shift1})$$
$$\text{gradient}V0[x][y] = (predSamplesL0[hx][vy+1 > \text{shift1}) - $$
$$(predSamplesL0[hx][vy-1] \gg \text{shift1})$$
$$\text{gradient}HL1[x][y] = (predSamplesL1hx+1][vy] \gg \text{shift1}) - $$
$$(predSamplesL1[hx-1][vy] \gg \text{shift1})$$
$$\text{gradient}V1[x][y] = (predSamplesL1[hx][vy+1] > \text{shift1}) - $$
$$(predSamplesL0[hx][vy-1] \gg \text{shift1})$$

Here, "predSamplesL0" and "predSamplesL1" are the prediction signals of L0 and L1 that are calculated in step S81. Further, [hx] and [vy] are defined by the following equation.

In the following equation, "nCbW" is a width of the block, "nCbH" is a height of the block, and "Clip3(min, max, input)" is a function for performing clipping such that a value of "input" is "min≤input≤max".

$$hx = \text{Clip3}(1, nCbW, x)$$
$$hy = \text{Clip3}(1, nCbH, y)$$

"shift1" is defined by the following equation.

$$\text{shift1} = \text{Max}(6, bitDepth - 6)$$

Here, "bitDepth" is a bit depth when performing processing of the pixel value.

In step S172, the prediction signal generation unit 111D/241D calculates a corrected MV.

Here, firstly, the prediction signal generation unit 111D/241D calculates values of the following three parameters for each pixel of the block or the sub-block.

$$\text{diff}[x][y] = (predSamplesL0[hx][vy] \gg \text{shift2} \gg \text{shift2}$$
$$tempH[x][y] = (\text{gradient}HL0[x][y] + \text{gradient}HL1[x][y]) \gg \text{shift3}$$
$$tempV[x][y] = (\text{gradient}VL0[x][y] + \text{gradient}VL1[x][y]) \gg \text{shift3}$$

Here, "shift2" and "shift3" are defined by the following equations.

$$\text{shift2} = \text{Max}(4, bitDepth - 8)$$
$$\text{shift3} = \text{Max}(3, 15 - bitDepth)$$

Secondly, the prediction signal generation unit 111D/241D divides the block or the sub-block into 4×4 pixel blocks, and calculates a parameter for each 4×4 pixel block as follows.

$$sGx2 = \sum_i \sum_j \text{Abs}(tempH[xSb + i][ySb + j]) \text{ with } i, \quad [\text{Equation 1}]$$
$$j = -1 \ldots 4$$

$$sGy2 = \sum_i \sum_j \text{Abs}(tempV[xSb + i][ySb + j]) \text{ with } i, j = -1 \ldots 4$$

$$sGxGy = \sum_i \sum_j (\text{Sign}(tempV[xSb + i][ySb + j]) *$$
$$tempH[xSb + i][ySb + j]) \text{ with } 1, j = -1 \ldots 4$$

$$sGxGy_m = sGxGy \gg 12$$

$$sGxGy_s = sGxGy \,\&\, ((1 \ll 12) - 1)$$

$$sGxdI = \sum_i \sum_j (-\text{Sign}(tempH[xSb + i][ySb + j]) *$$
$$diff[xSb + i][ySb + j]) \text{ with } i, j = -1 \ldots 4$$

$$sGydI = \sum_i \sum_j (-\text{Sign}(tempV[xSb + i][ySb + j]) *$$
$$diff[xSb + i][ySb + j]) \text{ with } i, j = -1 \ldots 4$$

Here, "xSb" and "yXb" are coordinates of an upper left pixel of each 4×4 pixel block when an upper left pixel of the block or the sub-block is set as the origin. In addition, "Sign (input)" is a function that returns "1" in a case where the value of "input" is a positive value, returns "−1" in a case where the value of "input" is a negative value, and returns "0" in a case where the value of "input" is "0".

The prediction signal generation unit 111D/241D calculates a corrected MV(vx, vy) using the calculated values as follows.

$$vx = sGx2 > 0 \,?\, \text{Clip } 3(-mv \text{ Refine Thres}, mv \text{ Refine Thres} - 1,$$
$$-(sGxdI \ll 3) \gg \text{Floor}(\text{Log } 2(sGx2))):0$$

$$vy = sGx2 > 0 \,?\, \text{Clip } 3(-mv \text{ Refine Thres}, mv \text{ Refine Thres} - 1,$$
$$((sGydI \ll 3) - ((vx \times sGxGy_m) \ll 12 + vx \times sGxGy_s) \gg 1) \gg$$
$$\text{Floor}(\text{Log } 2(sGx2))):0$$

Here, "mvRefineThres" is defined by the following equation.

$$mv \text{ Refine Thres} = 1 \ll \text{Max}(5, \text{bit Depth} - 7)$$

With the configuration, a bit width of each component of the corrected MV(vx, vy) can be suppressed within "1<<Max(5, bitDepth-7)+1" bits by encoding.

In step S173, the prediction signal generation unit 111D/241D corrects the prediction signal of each pixel as follows.

$$bd \text{ of Offset} =$$
$$(vx \times (\text{gradient } HL0[x + 1][y + 1] - \text{gradient } HL1[x + 1][y + 1])) \gg$$
$$1 + (vy \times (\text{gradient } VL0[x + 1][y + 1] -$$
$$\text{gradient } VL1[x + 1][y + 1])) \gg 1$$

$$pb \text{ Samples}[x][y] =$$
$$\text{Clip } 3(0, (2^{bit\,Depth}) - 1, (pred \text{ Samples } L0[x + 1][y + 1] + \text{offset } 4 +$$
$$pred \text{ Samples } L1[x + 1][y + 1] + bd \text{ of Offset}) \gg \text{shift } 4)$$

Here, "offset4" and "shift4" are defined by the following equations.

$$\text{offset } 4 = 1 \ll (\text{shift } 4 - 1)$$

$$\text{shift } 4 = \text{Max}(3, 15 - \text{bit Depth})$$

The prediction signal generation unit 111D/241D performs all the processing described above. Then, the process proceeds to step S174, and the processing is ended.

Next, a specific example of the PROF processing in step S113 will be described with reference to FIG. 18.

Figure 18:
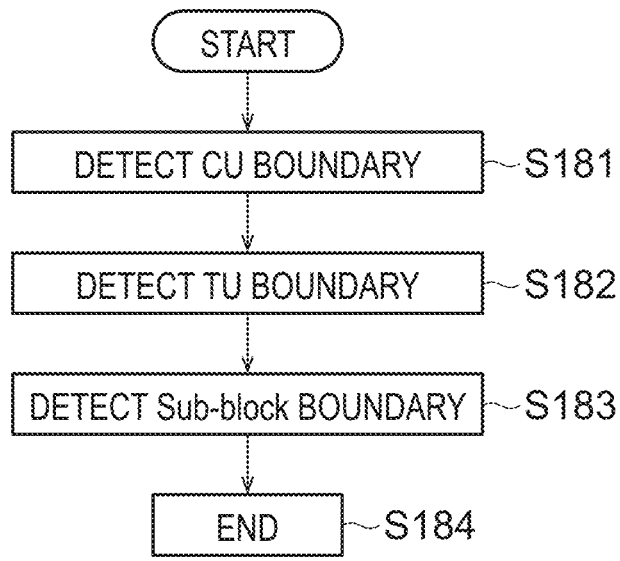
FIG. 18 is a diagram for explaining Modification Example 1.

As illustrated in FIG. 18, in step S181, the affine prediction signal generation unit 111F/241F calculates brightness value gradients in the horizontal direction and the vertical direction for each pixel in the reference blocks of L0 and L1 to which the PROF processing is applied.

Specifically, the affine prediction signal generation unit 111F/241F calculates the gradient for each pixel position (x, y) in the block by the following equation.

$$\text{gradient } H[x][y] = (pred \text{ Samples }[x + 2][y] \gg \text{shift } 1) -$$
$$(pred \text{ Samples }[x][y] \gg \text{shift } 1)$$
$$\text{gradient } V[x][y] = (pred \text{ Samples }[x][y + 2] \gg \text{shift } 1) -$$
$$(pred \text{ Samples }[x][y] \gg \text{shift } 1)$$

Here, "predSamples" is the prediction signal of L0 or L1 that is generated in step S111. Here, it is assumed that shift1=Max(6, bitDepth-6).

In a case where the PROF processing is applied to both of L0 and L1, the affine prediction signal generation unit 111F/241F calculates "gradientH" and "gradientV" for each of L0 and L1. In this case, the calculation content in step S181 is completely the same as the calculation content in step S171 in terms of units of pixels.

In step S182, the affine prediction signal generation unit 111F/241F calculates a corrected MV. The processing is actually performed in the affine motion vector calculation unit 111E/241E, as processing of step S96. On the other hand, for convenience, the processing will be described as being performed in step S182. Actually, the affine prediction signal generation unit 111F/241F may use the value calculated in step S96 as it is.

Firstly, the affine prediction signal generation unit 111F/241F calculates a value of "diffMv", similarly to the case of the description of step S96.

$$diffMv[x][y][0] = x \times (dHorX \ll 2) + y \times (dVerX \ll 2) - pos \text{ Offset } X$$

$$diffMv[x][y][1] = x \times (dHorY \ll 2) + y \times (dVerY \ll 2) - pos \text{ Offset } Y$$

Secondly, the affine prediction signal generation unit 111F/241F shifts the value of "diffMv" to the right by 7 bits.

Thirdly, the affine prediction signal generation unit 111F/241F performs clipping processing as follows.

$$diffMv[x][y][i] = \text{Clip } 3(-dmv \text{ Limit}, dmv \text{ Limit} - 1, diffMv[x][y][i])$$

Here, $$dmv\ \text{Limit} = 1 \ll \text{Max}(5, \text{bit Depth} - 7)$$

With the configuration, a bit width of each component of "diffMv" can be suppressed within "1<<Max(5, bitDepth-7)+1" bits by encoding. The bit width is the same bit width as the corrected MV calculated in step S172.

In step S183, the affine prediction signal generation unit 111F/241F corrects the prediction signal.

As described below, the affine prediction signal generation unit 111F/241F corrects the value of the prediction signal "pbSamples" for the block to which the PROF processing is applied and the prediction direction.

$$dI = \text{gradient}\ H[x][y] \times \textit{diffMv}[x][y][0] + \text{gradient}\ V[x][y] \times \textit{diffMv}[x][y][1]$$

$$pb\ \text{Samples}\ [x][y] = pred\ \text{Samples}[x+1][y+1] + (dI \gg 1)$$

In a case where the PROF processing is applied to both of L0 and L1, the affine prediction signal generation unit 111F/241F executes the processing for each of L0 and L1.

The affine prediction signal generation unit 111F/241F completes the correction. Then, the process proceeds to step S184, and the PROF processing is ended.

After the PROF processing is completed, the affine prediction signal generation unit 111F/241F executes prediction value combination processing described in step S114. The prediction value combination can be executed by, for example, the following equation.

$$pred\ \text{Samples}\ [x][y] = \text{Clip}\ 3(0, (1 \ll bit\ \text{Depth}) - 1,$$

$$(pred\ \text{Samples}\ L0[x][y] + pred\ \text{Samples}\ L1[x][y] + \text{offset}\ 2) \gg \text{shift}\ 2)$$

Here, $$\text{offset}\ 2 = 1 \ll (\text{shift}\ 2 - 1)$$

$$\text{shift}\ 2 = \text{Max}(3, 15 - \text{bit Depth})$$

Further, in a case where both of the prediction signal "predSamplesL0" of L0 and the prediction signal "predSamplesL1" of L1 are corrected by the PROF processing, when the calculation in step S183 is applied to "predSamplesL0" and "predSamplesL1", the following modified equation may be obtained.

$$dI\_Bi = (dI\_L0 \gg 1) + (dI\_L1 \gg 1)$$

$$pb\ \text{Samples}\ [x][y] = \text{Clips}(0, (1 \ll bit\ \text{Depth}) - 1,$$

$$(pred\ \text{Samples}\ L0\_\text{orig}[x][y] + \text{offset}\ 2 +$$

$$pred\ \text{Samples}\ L1\_\text{orig}[x][y] + dI\_Bi) \gg \text{shift}\ 2)$$

Here, "dI_L0" and "dI_L1" are a value of dI of L0 and a value of dI of L1, and "predSamplesL0_orig" and "predSamplesL1_orig" are prediction signals before correction by the PROF processing.

The values of the gradient and the corrected MV, which are calculated in the BDOF processing and the PROF processing described above, are clipped such that the bit widths are the same. Thus, the bit widths of "bdofOffset" and "dI Bi" calculated from the values are also the same.

That is, the calculation may be performed such that the offset amount calculated in the BDOF processing and the value obtained by combining the offset amounts calculated for each of the two reference frames (L0/L1) in the PROF processing have the same bit width, the BDOF processing being performed by the prediction signal generation unit 111D/241D, and the PROF processing being performed by the affine prediction signal generation unit 111F/241F.

In addition, the values of "offset2" and "shift2" when combining the prediction signals after the PROF processing are the same as the values of "offset4" and "shift4" in the BDOF processing. Therefore, in the prediction value generation processing in a case where the BDOF processing is applied and the prediction value generation processing in a case where the PROF processing is applied to both of L0 and L1, exactly the same equation is obtained.

By configuring the BDOF processing and the PROF processing as described above, the following is obtained.

Firstly, the gradient calculation processing in step S171 and the gradient calculation processing in step S181 may be exactly the same processing.

That is, the gradient calculation processing in the BDOF processing performed by the prediction signal generation unit 111D/241D may be the same processing as the gradient calculation processing in the PROF processing performed by the affine prediction signal generation unit 111F/241F in a case where the PROF processing is applied to both of the two reference frames (L0/L1).

Secondly, the bit width of the corrected MV output in step S172 may be exactly the same as the bit width of the corrected MV output in step S182.

That is, the clipping processing may be performed such that the corrected MV amount in the BDOF processing performed by the prediction signal generation unit 111D/241D and the corrected MV amount used in the PROF processing performed by the affine prediction signal generation unit 111F/241F have the same bit width.

Thirdly, the prediction value correction processing in step S173, the prediction value correction processing in step S183, and the prediction value combination processing in step S114 may be exactly the same processing.

That is, the final prediction signal generation processing, which is performed by the prediction signal generation unit 111D/241D and in which the offset amount is used, and the final prediction signal generation processing, which is performed by the affine prediction signal generation unit 111F/241F and in which the value obtained by combining the offset amounts is used, may be the same processing.

As described above, the BDOF processing and the PROF processing are exclusively applied to each block. Thus, in a case where the same processing part is realized by hardware, a processing circuit may be shared in the BDOF processing and the PROF processing. Thereby, a reduction in circuit scale can be expected.

Modification Example 2

Hereinafter, Modification Example 2 according to the embodiment will be described with reference to FIG. 19 and FIG. 20. Hereinafter, differences from the embodiment will be mainly described. In the present modification example, for the block boundary detection method by the block boundary detection unit 151/251 and the boundary intensity determination method by the boundary intensity determination unit 153/253, an example different from the embodiment will be described.

In the following description, the block boundary detection unit 151A will be described. On the other hand, the block boundary detection unit 151B/251A/251B can also detect a block boundary by similar processing.

FIG. 19 is a flowchart illustrating an example of processing of the block boundary detection unit 151A. Hereinafter, a case where processing is performed in units of CUs will be described as an example.

In step S191, the block boundary detection unit 151A detects a CU boundary. The block boundary detection unit 151A is a processing block that detects a boundary in the vertical direction. Thus, the block boundary detection unit 151A detects, as a block boundary as a filtering processing target, a boundary on the left side of the CU in the vertical direction.

Note that "detecting as a block boundary" corresponds to, for example, preparing a two-dimensional flag array (for example, "edgeFalgs[x][y]") indicating whether or not the pixel position in a screen is a boundary, setting a flag value of the pixel position which is detected as the boundary to "1", and setting a flag value of the pixel position which is not detected as the boundary to "0".

Here, in a case where the boundary on the left side of the CU in the vertical direction is located at a boundary in units of encoding such as a picture boundary, a slice boundary, or a tile boundary, the block boundary detection unit 151A may not detect the boundary as a block boundary.

The block boundary detection unit 151A detects the CU boundary by the procedure, and then the process proceeds to step S192.

In step S192, the block boundary detection unit 151A detects a TU boundary (transformation block boundary).

The block boundary detection unit 151A confirms whether or not each pixel position is a TU boundary while increasing the coordinate in the horizontal direction by 4 pixels and increasing the pixel position in the vertical direction by 1 pixel, starting from the boundary on the left side of the CU in the vertical direction. In a case where the pixel position is a TU boundary, the block boundary detection unit 151A detects the pixel position as a block boundary.

The block boundary detection unit 151A detects the TU boundary by the procedure, and then the process proceeds to step S193.

In step S193, the block boundary detection unit 151A detects a sub-block boundary.

The sub-block boundary as a detection target in step S193 may be, for example, a sub-block boundary of the CU on which inter-prediction is performed.

At this time, the sub-block boundary may include a boundary of the sub-block (for example, 16×16 pixel size) in the DMVR processing executed by the refinement unit 111C/241C and a boundary of the sub-block (for example, 4×4 pixel size) in the affine motion compensation performed by the affine motion vector calculation unit 111E/241E and the affine prediction signal generation unit 111F/241F.

The sub-block boundary as a detection target in step S193 may be, for example, a sub-block boundary of the CU to which the affine motion compensation or "merge_subblock" is applied.

In a case where the PROF processing is applied to the CU, the sub-block in the affine motion compensation matches with the sub-block in the PROF processing.

Here, in a case where the sub-block boundary in the affine motion compensation is set as the detection target in step S193, the block boundary detection unit 151A may exclude, from the detection target, the sub-block boundary in the affine motion compensation and the sub-block boundary in the PROF processing in a case where the PROF processing is applied to the CU.

That is, the block boundary detection unit 151A may set, as the detection target, the sub-block boundary in the affine motion compensation only in a case where the affine motion compensation is applied to the CU and the PROF processing is not applied to the CU. Of course, the block boundary detection unit 151A may also set, as the detection target, the sub-block boundary in the affine motion compensation and the sub-block boundary in the PROF processing in a case where the PROF processing is applied to the CU.

The block boundary detection unit 151A may regard the sub-block boundary of the block on which bi-prediction is performed, as the "CU to which the PROF processing is applied" in a case where the PROF processing is applied to at least one of L0 and L1. Further, the block boundary detection unit 151A may regard the sub-block boundary of the block on which bi-prediction is performed, as the "CU to which the PROF processing is applied" only in a case where the PROF processing is applied to both of L0 and L1. The same applies to the following description.

The block boundary detection unit 151A confirms whether or not each pixel position is a sub-block boundary while increasing the coordinate in the horizontal direction by a sub-block size calculated by the following method and increasing the pixel position in the vertical direction by 1 pixel, starting from the boundary on the left side of the CU in the vertical direction.

In a case where the pixel position is a sub-block boundary, the block boundary detection unit 151A detects the pixel position as a block boundary. Here, even when the position is a sub-block boundary, the block boundary detection unit 151A may not detect the position as a sub-block boundary in a case where the PROF processing is applied to the CU.

The sub-block size may be calculated, for example, as follows.

$$\text{sub-block size} = \text{Max}(8, (nCWb/NumSbX))$$

Here, "nCbW" is a width (the number of pixels in the horizontal direction) of the CU, and "NumSbX" is the number of sub-blocks included in the CU in the horizontal direction.

In a case where the equation is used, it is determined whether or not the sub-block boundary is a sub-block boundary at intervals of every 8 pixels as smallest units in the horizontal direction, starting from the boundary on the left side of the CU in the vertical direction.

Further, the sub-block size may be calculated, for example, as follows.

$$\text{sub-block size} = \text{Max}(4, (nCbW/NumSbX))$$

In this case, it is determined whether or not the sub-block boundary is a sub-block boundary at intervals of every 4 pixels as smallest units in the horizontal direction, starting from the boundary on the left side of the CU in the vertical direction.

That is, the block boundary detection unit 151A is configured to determine whether or not the target pixel position is a sub-block boundary at intervals of at least every 4 pixels with reference to a coordinate of a left end or an upper end of the target block.

The block boundary detection unit 151A detects a sub-block boundary by the procedure. Then, the process proceeds to step S194, and the processing is ended.

In the above description, an example in which the CU boundary, the TU boundary, and the sub-block boundary are simply detected as the block boundary without being distinguished from each other has been described. On the other hand, the CU boundary, the TU boundary, and the sub-block boundary may be stored by being distinguished from each other.

For example, the CU boundary, the TU boundary, and the sub-block boundary may be stored by being distinguished from each other, or may be distinguished as the TU boundary and the motion vector boundary. At this time, the CU boundary is detected as the TU boundary and the motion vector boundary. Further, the TU boundary is detected as the TU boundary, and the sub-block boundary is detected as the motion vector boundary. The distinguishment may be used, for example, in the boundary intensity determination unit 153A.

In the following description, the boundary intensity determination unit 153A will be described. On the other hand, the boundary intensity determination unit 153B/253A/253B can perform exactly the same determination.

The boundary intensity determination unit 153A may be configured to determine the boundary intensity as "0" in a case where the target pixel position is not a block boundary.

That is, the block boundary detection unit 151 may be configured not to detect, as a block boundary, a sub-block in a block to which the PROF processing is applied, the boundary intensity determination unit 153A may be configured to determine the boundary intensity of the pixel position which is not detected as a block boundary as "0", and the filter determination unit 154 may be configured to determine not to apply the deblocking filter to the block boundary in a case where the boundary intensity is "0".

The boundary intensity determination unit 153A may be configured to determine a boundary intensity of a block boundary based on control data indicating whether or not the target block and the adjacent block are intra-prediction blocks.

For example, as illustrated in FIG. 20, in a case where at least one block of the target block and the adjacent block is an intra-prediction block (that is, in a case where at least one of the blocks on both sides of the block boundary is an intra-prediction block), the boundary intensity determination unit 153A may be configured to determine that the boundary intensity of the block boundary is "2".

Further, the boundary intensity determination unit 153A may be configured to determine a boundary intensity of a block boundary based on control data indicating whether or not a non-zero orthogonal transformation coefficient is included in the target block and the adjacent block and whether or not the block boundary is a boundary of the transformation block.

For example, as illustrated in FIG. 20, in a case where at least one block of the target block and the adjacent block includes a non-zero orthogonal transformation coefficient and the block boundary is a boundary of the transformation block (that is, in a case where a non-zero transformation coefficient exists in at least one of the blocks on both sides of the block boundary and the block boundary is a boundary of the transformation block TU), the boundary intensity determination unit 153A may be configured to determine that the boundary intensity of the block boundary is "1".

Further, the boundary intensity determination unit 153A may be configured to determine a boundary intensity of a block boundary based on control data indicating whether or not an absolute value of a difference between the motion vectors of the target block and the adjacent block is equal to or larger than a threshold value (for example, ½ pixel). At that time, the boundary intensity determination unit 153A may be configured to determine the boundary intensity of the block boundary based on whether or not the block boundary is the sub-block boundary in the block to which the PROF processing is applied.

For example, as illustrated in FIG. 20, in a case where an absolute value of a difference between the motion vectors of the target block and the adjacent block is equal to or larger than a threshold value (for example, ½ pixel) (that is, an absolute value of a difference between the motion vectors of the blocks on both sides of the block boundary is equal to or larger than a threshold value (for example, ½ pixel)) and in a case where the block boundary is not a sub-block (4×4 pixel block) boundary of the block determined to apply the PROF processing in step S95, the boundary intensity determination unit 153A may be configured to determine that the boundary intensity of the block boundary is "1".

That is, the boundary intensity determination unit 153A may be configured to determine the boundary intensity for each block boundary, and may be configured to determine the boundary intensity as "1" in a case where the absolute value of the difference between the motion vectors of the blocks on both sides of the block boundary is equal to or larger than ½ pixel and the block boundary is not a sub-block boundary to which the PROF processing is applied.

Here, the filter determination unit 154 may be configured to determine not to apply the deblocking filter to the block boundary in a case where the boundary intensity is "0".

For example, in a case where an absolute value of a difference between the motion vectors of the target block and the adjacent block is equal to or larger than a threshold value (for example, ½ pixel) (that is, in a case where an absolute value of a difference between the motion vectors of the blocks on both sides of the block boundary is equal to or larger than a threshold value (for example, ½ pixel)) and in a case where the blocks on both sides of the block boundary are not the block determined to apply the PROF processing in step S95, the boundary intensity determination unit 153A may be configured to determine that the boundary intensity of the block boundary is "1".

For example, in a case where an absolute value of a difference between the motion vectors of the target block and the adjacent block is equal to or larger than a threshold value (for example, ½ pixel) (that is, in a case where an absolute value of a difference between the motion vectors of the blocks on both sides of the block boundary is equal to or larger than a threshold value (for example, ½ pixel)) and in a case where at least one block of the block boundary is not the block determined to apply the PROF processing in step S95, the boundary intensity determination unit 153A may be configured to determine that the boundary intensity of the block boundary is "1".

The sub-block boundary of the block on which bi-prediction is performed may be regarded as the "block determined to apply the PROF processing" in a case where the PROF processing is applied to at least one of L0 and L1. That is, in a case where the PROF processing is not applied to both of L0 and L1 and a case where the difference between the motion vectors is equal to or larger than the threshold value, the boundary intensity is determined as "1".

That is, the boundary intensity determination unit 153A may be configured to regard that the PROF processing is applied to the target block in a case where the target block is a block on which bi-prediction is performed and the PROF processing is applied to at least one of the two reference frames.

Further, only in a case where the PROF processing is applied to both of L0 and L1, the block may be regarded as a "block determined to apply the PROF processing".

That is, in a case where the PROF processing is applied to only L0 or L1 and a case where the difference between the motion vectors is equal to or larger than the threshold value, the boundary intensity is determined as "1".

Further, as another example, in a case where a determination of the boundary intensity is performed at the block boundary to which the PROF processing is applied, the difference between the motion vectors may not be determined, or it may be determined that the difference between the motion vectors is regarded as "0". As a specific example, the following determination may be performed.

In a case where the block is a block on which uni-prediction is performed and the PROF processing is applied to the block, in the determination of the boundary intensity at the sub-block boundary, the difference between the motion vectors is not determined, or the difference between the motion vectors is regarded as "0".

In a case where the block is a block on which bi-prediction is performed and the reference frame of L0 and the reference frame of L1 are different from each other, in the prediction directions of L0 and L1 (only L0, only L1, or both of L0 and L1) in which the PROF processing is applied, the difference between the motion vectors is not determined, or the difference between the motion vectors is regarded as "0".

In a case where the block is a block on which bi-prediction is performed and the reference frame of L0 and the reference frame of L1 are the same frame, when the PROF processing is applied to L0, the difference between the motion vectors of L0 on both sides of the sub-block boundary is not determined, or the difference between the motion vectors of L0 on both sides of the sub-block boundary is regarded as "0".

Similarly, in a case where the PROF processing is applied to L1, the difference between the motion vectors of L1 on both sides of the sub-block boundary is not determined, or the difference between the motion vectors of L1 on both sides of the sub-block boundary is regarded as "0".

In this case, the difference between the motion vectors of L0 and L1 is used for determination of the boundary intensity as in the related art. Specifically, for example, the difference between the motion vector of L0 of the sub-block on the left side of the sub-block boundary and the motion vector of L1 of the sub-block on the right side of the sub-block boundary is used for determination of the boundary intensity.

That is, in determination of the difference between the motion vectors in the same prediction directions of the blocks on both sides of the target boundary, in a case where the PROF processing is applied in the prediction direction, the boundary intensity determination unit 153A may be configured not to determine the difference between the motion vectors in the prediction directions or to regard the difference between the motion vectors in the prediction directions as "0".

Alternatively, in a case where the block is a block on which bi-prediction is performed and the reference frame of L0 and the reference frame of L1 are the same frame, when the PROF processing is applied to the motion vectors on both sides of the sub-block boundary, the difference between the motion vectors may not be determined, or the difference between the motion vectors may be regarded as "0".

In this case, for example, in a case where the PROF processing is applied to both of L0 and L1, the difference between the motion vectors of L0 and L1 is not determined, or the difference between the motion vectors of L0 and L1 is regarded as "0". This is different from the example.

Further, the boundary intensity determination unit 153A may be configured to determine a boundary intensity of a block boundary based on control data indicating whether or not reference blocks referred to in the prediction of the motion vectors of the target block and the adjacent block are different from each other.

For example, as illustrated in FIG. 20, in a case where reference blocks referred to in the prediction of the motion vectors of the target block and the adjacent block are different from each other (that is, in a case where reference images are different from each other in the blocks on both sides of the block boundary), the boundary intensity determination unit 153A may be configured to determine that the boundary intensity of the block boundary is "1".

The boundary intensity determination unit 153A may be configured to determine a boundary intensity of a block boundary based on control data indicating whether or not the number of the motion vectors of the target block and the number of the motion vectors of the adjacent block are different from each other.

For example, as illustrated in FIG. 20, in a case where the number of the motion vectors of the target block and the number of the motion vectors of the adjacent block are different from each other (that is, in a case where the number of the motion vectors differs in the blocks on both sides of the block boundary), the boundary intensity determination unit 153A may be configured to determine that the boundary intensity of the block boundary is "1".

In the above description, an example of the method of determining the boundary intensity using the motion vector or the reference block has been described. On the other hand, the determination using the motion vector or the reference block may be performed only on the CU boundary, the sub-block boundary, or the block boundary detected as the motion vector boundary.

That is, for the block boundary that is the TU boundary and is not the sub-block boundary or the motion vector boundary, the determination using the motion vector or the reference block may be skipped. At this time, for the TU boundary, it is only confirmed whether or not a non-zero orthogonal transformation coefficient exists in at least one of the blocks on both sides of the boundary.

For example, as illustrated in FIG. 20, the boundary intensity determination unit 153A may be configured to determine that the boundary intensity of the block boundary is "0" in a case where none of the conditions is satisfied.

That is, the affine prediction signal generation unit 111F/241F is configured to determine availability/non-availability of the PROF processing for each block and perform the PROF processing for each sub-block obtained by dividing the block in a case where the PROF processing is applied.

Further, the in-loop filter processing unit 150/250 is configured to determine availability/non-availability of the deblocking filter for each block boundary and determine not to apply the deblocking filter to the sub-block boundary of the block to which the PROF processing is applied.

With the configuration, the boundary intensity of the block boundary or the sub-block boundary to which the PROF processing is applied becomes "0", and thus the deblocking filter is not applied. The PROF processing has an effect of improving subjective image quality. With the configuration, the pixel value at the block boundary is corrected by the deblocking filter, and thus it is possible to prevent the subjective image quality from being deteriorated.

Further, the image encoding device 100 and the image decoding device 200 may be realized as a program causing a computer to execute each function (each step).

Note that the above described embodiments have been described by taking application of the present invention to the image encoding device 10 and the image decoding device 30 as examples. However, the present invention is not limited only thereto, but can be similarly applied to an encoding/decoding system having functions of the image encoding device 10 and the image decoding device 30.

According to the present invention, it is possible to control ON/OFF of the PROF processing in small units in consideration of a trade-off between processing capability of the image encoding device and the image decoding device and image quality.

REFERENCE SIGNS LIST 10 image processing system
100 image encoding device
111, 241 inter-prediction unit
111A motion vector search unit
111B motion vector encoding unit
111C, 241C refinement unit
111D, 241D prediction signal generation unit
111E, 241E affine motion vector calculation unit
111F, 241F affine prediction signal generation unit
112, 242 intra-prediction unit
121 subtractor
122, 230 adder
131 transformation/quantization unit
132, 220 inverse transformation/inverse quantization unit
140 encoding unit
150, 250 in-loop filter processing unit
160, 260 frame buffer
200 image decoding device
210 decoding unit
241B motion vector decoding unit

What is claimed is:

1. An image decoding device comprising:
a memory storing instructions; and
one or more processors configured to:
   determine whether or not an application condition of BDOF (Bi-Directional Optical Flow) processing is satisfied for each block based on:
      a first time distance between a target frame and a first reference frame of two reference frames being equal to a second time distance between the target frame and a second reference frame of the two reference frames, and
      a first weight coefficient of the first reference frame and a second weight coefficient of the second reference frame;
   divide each block into sub-blocks; and
   if it is determined that the application condition of BDOF processing is satisfied, perform the BDOF processing to generate a prediction signal for each of the sub-blocks.

2. An image decoding method comprising:
storing instructions in a memory;
determining whether or not an application condition of BDOF processing is satisfied for each block based on:
   a first time distance between a target frame and a first reference frame of two reference frames being equal to a second time distance between the target frame and a second reference frame of the two reference frames, and
   a first weight coefficient of the first reference frame and a second weight coefficient of the second reference frame;
dividing each block into sub-blocks; and
if it is determined that the application condition of BDOF processing is satisfied, performing the BDOF processing to generate a prediction signal for each of the sub-blocks.

3. A non-transitory computer readable medium with instructions thereon that when executed by one or more processors of an image decoding device, cause the processor program causing a computer to function as an image decoding device, the image decoding device being configured to:
determining whether or not an application condition of BDOF processing is satisfied for each block based on:
   a first time distance between a target frame and a first reference frame of two reference frames being equal to a second time distance between the target frame and a second reference frame of the two reference frames, and
   a first weight coefficient of the first reference frame and a second weight coefficient of the second reference frame;
dividing each block into sub-blocks; and
if it is determined that the application condition of BDOF processing is satisfied, performing the BDOF processing to generate a prediction signal for each of the sub-blocks.

* * * * *